United States Patent
Terre et al.

(10) Patent No.: US 9,813,643 B2
(45) Date of Patent: Nov. 7, 2017

(54) THERMAL RECOGNITION SYSTEMS AND METHODS

(71) Applicant: FLIR Systems, Inc., Wilsonville, OR (US)

(72) Inventors: William A. Terre, Santa Barbara, CA (US); Nicholas Högasten, Santa Barbara, CA (US)

(73) Assignee: FLIR Systems, Inc., Wilsonville, OR (US)

( * ) Notice: Subject to any disclaimer, the term of this patent is extended or adjusted under 35 U.S.C. 154(b) by 214 days.

(21) Appl. No.: 14/726,209

(22) Filed: May 29, 2015

(65) Prior Publication Data

US 2015/0358557 A1    Dec. 10, 2015

Related U.S. Application Data

(60) Provisional application No. 62/008,902, filed on Jun. 6, 2014.

(51) Int. Cl.
| | |
|---|---|
| *H04N 5/33* | (2006.01) |
| *H04N 7/18* | (2006.01) |
| *H04N 5/225* | (2006.01) |
| *H04N 5/232* | (2006.01) |
| *H04N 5/365* | (2011.01) |
| *H04N 17/00* | (2006.01) |

(52) U.S. Cl.
CPC ............ *H04N 5/33* (2013.01); *H04N 5/2251* (2013.01); *H04N 5/2257* (2013.01); *H04N 5/23219* (2013.01); *H04N 5/365* (2013.01); *H04N 5/3656* (2013.01); *H04N 5/3658* (2013.01); *H04N 17/002* (2013.01)

(58) Field of Classification Search
None
See application file for complete search history.

(56) References Cited

U.S. PATENT DOCUMENTS

| | | | |
|---|---|---|---|
| 9,202,105 B1* | 12/2015 | Wang | G06Q 20/4014 |
| 2005/0285953 A1* | 12/2005 | Hasegawa | G08B 13/19608 |
| | | | 348/239 |
| 2006/0017821 A1* | 1/2006 | Garvey, III | H04N 5/77 |
| | | | 348/231.3 |

(Continued)

*Primary Examiner* — Talha M Nawaz
(74) *Attorney, Agent, or Firm* — Haynes and Boone, LLP

(57) ABSTRACT

Various techniques are disclosed for providing object recognition using thermal imaging. Unique thermal features of an object such as a human face can be detected using a thermal imaging module. The thermal imaging module may be included in an authentication system that performs authentication operations for users of a secure system based on the detected thermal features. The thermal features may include a thermal map of a user's face. An object recognition system such as an authentication system may include a non-thermal imaging module that captures non-thermal images of the object. The object recognition system may recognize objects using thermal images and non-thermal images in separate object recognition operations or by combining the thermal and non-thermal images and performing object recognition operations using the combined image. A thermal imaging authentication system may help eliminate user passwords on phones, tablets, computers and/or other secure access systems.

16 Claims, 16 Drawing Sheets

(56) References Cited

U.S. PATENT DOCUMENTS

| | | | | |
|---|---|---|---|---|
| 2006/0289772 A1* | 12/2006 | Johnson | ............... | G01C 3/08 |
| | | | | 250/370.08 |
| 2012/0326959 A1* | 12/2012 | Murthi | ............... | G06K 9/209 |
| | | | | 345/156 |
| 2012/0327218 A1* | 12/2012 | Baker | ............ | H04N 5/23212 |
| | | | | 348/135 |
| 2013/0135468 A1* | 5/2013 | Kim | ............... | G06K 9/00771 |
| | | | | 348/143 |
| 2014/0104415 A1* | 4/2014 | Fox | ............ | H04N 5/332 |
| | | | | 348/135 |
| 2014/0139643 A1* | 5/2014 | Hogasten | ........ | H01L 27/14609 |
| | | | | 348/48 |
| 2014/0168433 A1* | 6/2014 | Frank | ............ | H04N 5/33 |
| | | | | 348/143 |
| 2015/0334315 A1* | 11/2015 | Teich | ............... | H04N 5/2257 |
| | | | | 348/164 |
| 2015/0358560 A1* | 12/2015 | Boulanger | ........ | H04N 5/332 |
| | | | | 348/164 |
| 2016/0203306 A1* | 7/2016 | Boshra | ............ | G06F 21/32 |
| | | | | 726/19 |

* cited by examiner

THERMAL RECOGNITION SYSTEMS AND METHODS

CROSS-REFERENCE TO RELATED APPLICATIONS

This application claims the benefit of and priority to U.S. Provisional Patent Application No. 62/008,902 filed Jun. 6, 2014 and entitled "SYSTEMS AND METHODS FOR THERMAL RECOGNITION" which is hereby incorporated by reference in its entirety.

TECHNICAL FIELD

One or more embodiments of the invention relate generally to imaging devices and more particularly, for example, to recognition and identification of objects using imaging devices.

BACKGROUND

Mobile phones, computers, buildings and other secure systems often include authentication systems and processes. Current authentication systems include identification cards, passcodes or passwords, fingerprints, retina scans, and facial recognition processes using visible light cameras for authentication of an authorized user of the system. However, if care is not taken, these systems can be insecure since cards and codes can be lost or stolen, fingerprints can be copied, and facial recognition operations with visible sensors can both require a source of visible light to illuminate the face to be recognized and can be fooled by a picture or mask of an authorized person. It would therefore be desirable to provide improved object recognition systems such as authentication systems.

SUMMARY

Various embodiments are disclosed for systems and methods for identification of objects using thermal images. A system may include one or more thermal imagers for capturing thermal images of the objects. The system may be arranged to recognize the objects based at least in part on the thermal images. For example, the system may extract identifying features such as a thermal profile or map of a user's face from a thermal image and compare the extracted identifying features with stored identifying features of known objects and/or authorized users. In some embodiments, the system may include a non-thermal imager for capturing non-thermal images of the objects. The objects may be recognized using the thermal images and the non-thermal images, according to some embodiments. The objects may be recognized using the thermal images and the non-thermal images in separate object recognition operations or in an object recognition operation using a combined image formed from the thermal image and the non-thermal image.

According to various embodiments, an authentication system may be used to control access to a secure system. The authentication system may be used to determine whether a potential user is an authorized user of the secure system by performing recognition operations such as facial recognition operations using thermal and/or non-thermal images of the potential user.

In accordance with one embodiment, a secure system may be an electronic device such as a mobile phone, a tablet computer, a laptop computer, a desktop computer, or other electronic device. For example, an electronic device such a user's mobile phone that is locked may capture a thermal image of the user and, based at least in part on the thermal image, recognize the user and unlock and provide the user access to the mobile phone.

In another embodiment, a secure system may be a location such as a building, an airport, a secure area of an airport, a prison, a portion of a prison, or any other suitable location or area. For example, an imaging device including one or more thermal and/or non-thermal imaging modules may be mounted at an entrance to the secure system and, based at least in part on thermal images captured by the imaging modules, access to the location may be automatically and/or manually controlled (e.g., using a gate, a door, or other automatic or manual security mechanism).

In accordance with an embodiment, an authentication system is provided that includes an infrared imaging module arranged to capture a thermal image of a user and a processor in communication with the infrared imaging module, in which the processor is arranged to recognize the user in the thermal image based on a unique thermal profile of the user.

In accordance with another embodiment, a system is provided that includes a thermal imaging module arranged to capture a thermal image of a user, a non-thermal imaging module arranged to capture a non-thermal image of the user, and a processor in communication with the thermal imaging module and the non-thermal imaging module, in which the processor is arranged to recognize the user based on the thermal image and the non-thermal image.

In accordance with another embodiment, a method is provided that includes capturing a thermal image of an object, and recognizing the object based on the thermal image. Recognizing the object may include extracting identifying features of the object from the thermal image and comparing the extracted identifying features with stored identifying features of a plurality of objects.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the invention and their advantages are best understood by referring to the detailed description that follows. It should be appreciated that like reference numerals are used to identify like elements illustrated in one or more of the figures.

DETAILED DESCRIPTION

Figure 1:
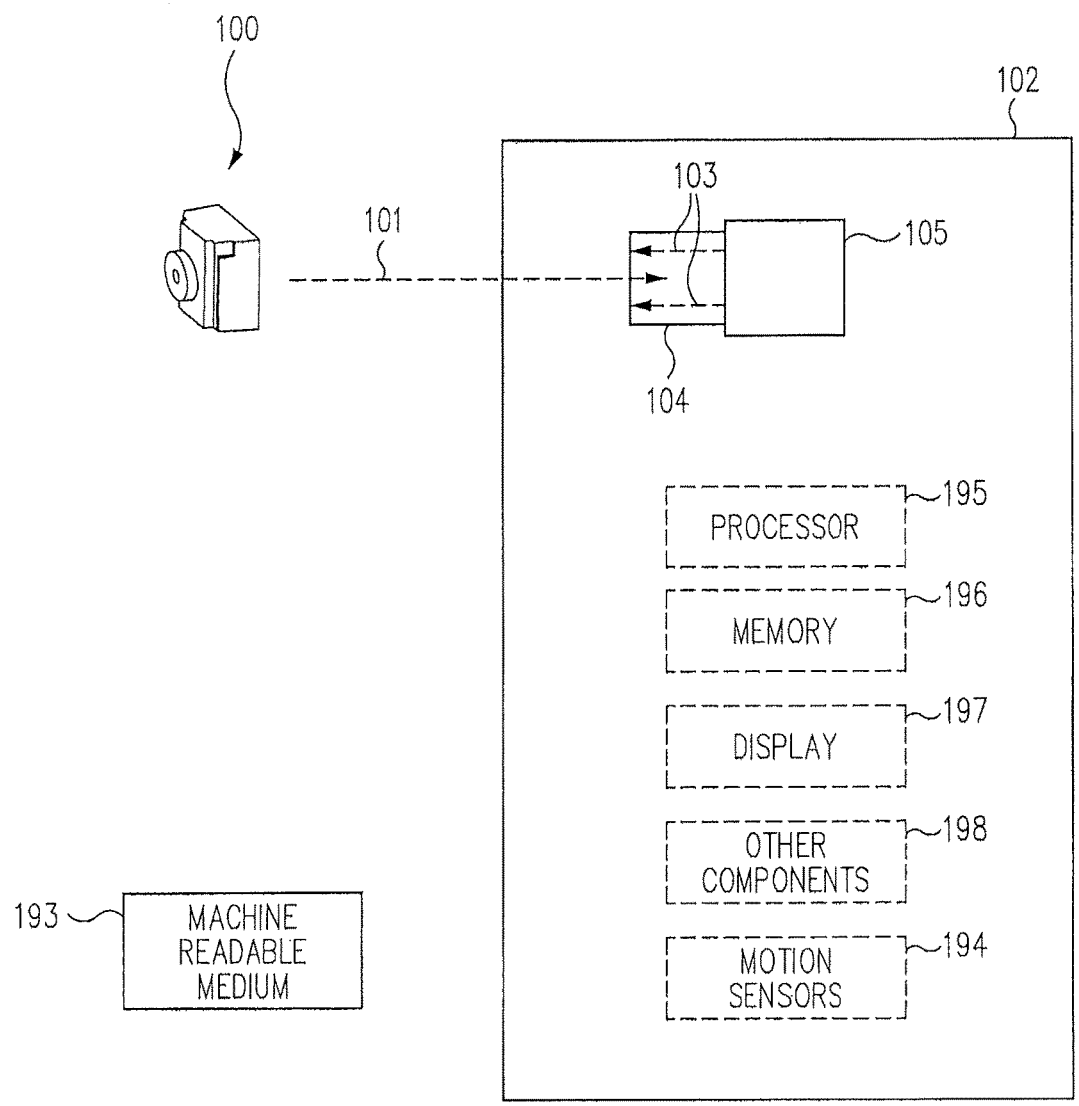
FIG. 1 illustrates an infrared imaging module configured to be implemented in a host device in accordance with an embodiment of the disclosure.

FIG. 1 illustrates an infrared imaging module 100 (e.g., an infrared camera or an infrared imaging device) configured to be implemented in a system such as host device 102 in accordance with an embodiment of the disclosure. Infrared imaging module 100 may be implemented, for one or more embodiments, with a small form factor and in accordance with wafer level packaging techniques or other packaging techniques.

In one embodiment, infrared imaging module 100 may be configured to be implemented in a small portable host device 102, such as a mobile telephone, a tablet computing device, a laptop computing device, a personal digital assistant, a visible light camera, a music player, a wearable device, or any other appropriate mobile device. In other embodiments, infrared imaging module 100 may be configured to be implemented in a stationary device or system such as a camera of an authentication system. In this regard, infrared imaging module 100 may be used to provide infrared imaging features to host device 102. For example, infrared imaging module 100 may be configured to capture, process, and/or otherwise manage infrared images and provide such infrared images to host device 102 for use in any desired fashion (e.g., for further processing, to store in memory, to display, to use by various applications running on host device 102, to export to other devices, or other uses).

In various embodiments, infrared imaging module 100 may be configured to operate at low voltage levels and over a wide temperature range. For example, in one embodiment, infrared imaging module 100 may operate using a power supply of approximately 2.4 volts, 2.5 volts, 2.8 volts, or lower voltages, and operate over a temperature range of approximately −20 degrees C. to approximately +60 degrees C. (e.g., providing a suitable dynamic range and performance over an environmental temperature range of approximately 80 degrees C.). In one embodiment, by operating infrared imaging module 100 at low voltage levels, infrared imaging module 100 may experience reduced amounts of self heating in comparison with other types of infrared imaging devices. As a result, infrared imaging module 100 may be operated with reduced measures to compensate for such self heating.

Figure 2:
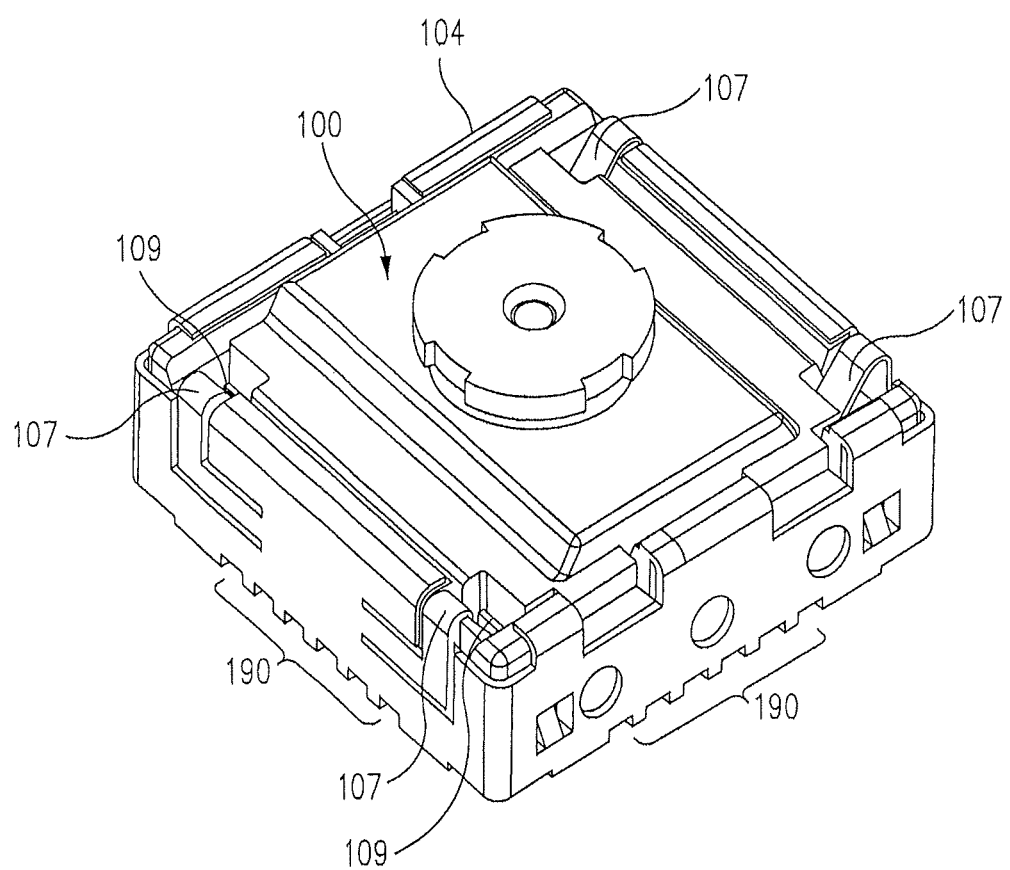
FIG. 2 illustrates an assembled infrared imaging module in accordance with an embodiment of the disclosure.

As shown in FIG. 1, host device 102 may include a socket 104, a shutter 105, motion sensors 194, a processor 195, a memory 196, a display 197, and/or other components 198. Socket 104 may be configured to receive infrared imaging module 100 as identified by arrow 101. In this regard, FIG. 2 illustrates infrared imaging module 100 assembled in socket 104 in accordance with an embodiment of the disclosure.

Motion sensors 194 may be implemented by one or more accelerometers, gyroscopes, or other appropriate devices that may be used to detect movement of host device 102. Motion sensors 194 may be monitored by and provide information to processing module 160 or processor 195 to detect motion. In various embodiments, motion sensors 194 may be implemented as part of host device 102 (as shown in FIG. 1), infrared imaging module 100, or other devices attached to or otherwise interfaced with host device 102.

Processor 195 may be implemented as any appropriate processing device (e.g., logic device, microcontroller, processor, application specific integrated circuit (ASIC), or other device) that may be used by host device 102 to execute appropriate instructions, such as software instructions provided in memory 196. Display 197 may be used to display captured and/or processed infrared images and/or other images, data, and information. Other components 198 may be used to implement any features of host device 102 as may be desired for various applications (e.g., clocks, temperature sensors, a visible light camera, or other components). In addition, a machine readable medium 193 may be provided for storing non-transitory instructions for loading into memory 196 and execution by processor 195.

In various embodiments, infrared imaging module 100 and socket 104 may be implemented for mass production to facilitate high volume applications, such as for implementation in mobile telephones or other devices (e.g., requiring small form factors). In one embodiment, the combination of infrared imaging module 100 and socket 104 may exhibit overall dimensions of approximately 8.5 mm by 8.5 mm by 5.9 mm while infrared imaging module 100 is installed in socket 104.

Figure 3:
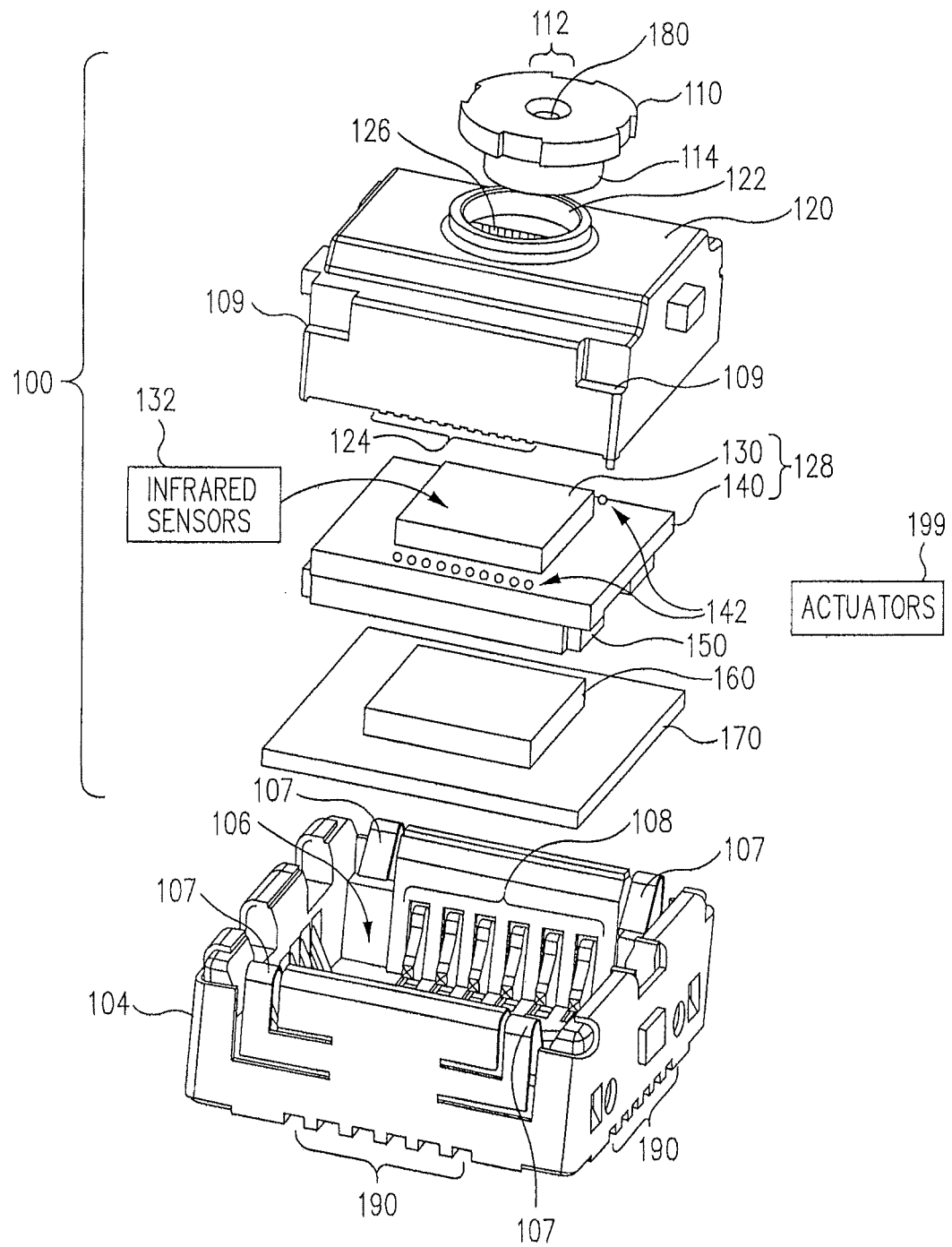
FIG. 3 illustrates an exploded view of an infrared imaging module juxtaposed over a socket in accordance with an embodiment of the disclosure.

FIG. 3 illustrates an exploded view of infrared imaging module 100 juxtaposed over socket 104 in accordance with an embodiment of the disclosure. Infrared imaging module 100 may include a lens barrel 110, a housing 120, an infrared sensor assembly 128, a circuit board 170, a base 150, and a processing module 160.

Lens barrel 110 may at least partially enclose an optical element 180 (e.g., a lens) which is partially visible in FIG. 3 through an aperture 112 in lens barrel 110. Lens barrel 110 may include a substantially cylindrical extension 114 which may be used to interface lens barrel 110 with an aperture 122 in housing 120.

Infrared sensor assembly 128 may be implemented, for example, with a cap 130 (e.g., a lid) mounted on a substrate 140. Infrared sensor assembly 128 may include a plurality of infrared sensors 132 (e.g., infrared detectors) implemented in an array or other fashion on substrate 140 and covered by cap 130. For example, in one embodiment, infrared sensor assembly 128 may be implemented as a focal plane array (FPA). Such a focal plane array may be implemented, for example, as a vacuum package assembly (e.g., sealed by cap 130 and substrate 140). In one embodiment, infrared sensor assembly 128 may be implemented as a wafer level package (e.g., infrared sensor assembly 128 may be singulated from a set of vacuum package assemblies provided on a wafer). In one embodiment, infrared sensor assembly 128 may be implemented to operate using a power supply of approximately 2.4 volts, 2.5 volts, 2.8 volts, or similar voltages.

Infrared sensors 132 may be configured to detect infrared radiation (e.g., infrared energy) from a target scene including, for example, mid wave infrared wave bands (MWIR), long wave infrared wave bands (LWIR), and/or other thermal imaging bands as may be desired in particular implementations. In one embodiment, infrared sensor assembly 128 may be provided in accordance with wafer level packaging techniques.

Infrared sensors 132 may be implemented, for example, as microbolometers or other types of thermal imaging infrared sensors arranged in any desired array pattern to provide a plurality of pixels. In one embodiment, infrared sensors 132 may be implemented as vanadium oxide (VOx) detectors with a 17 μm pixel pitch. In various embodiments, arrays of approximately 32 by 32 infrared sensors 132, approximately 64 by 64 infrared sensors 132, approximately 80 by 64 infrared sensors 132, or other array sizes may be used.

Substrate 140 may include various circuitry including, for example, a read out integrated circuit (ROIC) with dimensions less than approximately 5.5 mm by 5.5 mm in one embodiment. Substrate 140 may also include bond pads 142 that may be used to contact complementary connections positioned on inside surfaces of housing 120 when infrared imaging module 100 is assembled as shown in FIG. 3. In one embodiment, the ROIC may be implemented with low-dropout regulators (LDO) to perform voltage regulation to reduce power supply noise introduced to infrared sensor assembly 128 and thus provide an improved power supply rejection ratio (PSRR). Moreover, by implementing the LDO with the ROIC (e.g., within a wafer level package), less die area may be consumed and fewer discrete die (or chips) are needed.

Figure 4:
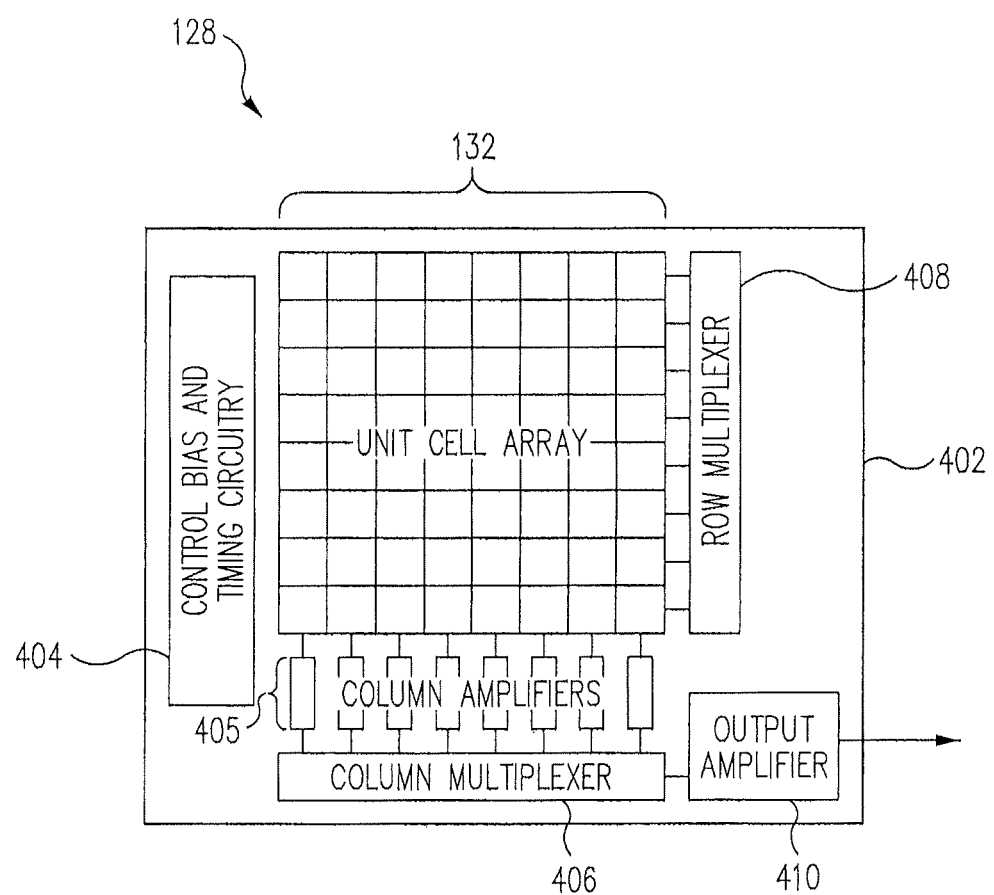
FIG. 4 illustrates a block diagram of an infrared sensor assembly including an array of infrared sensors in accordance with an embodiment of the disclosure.

FIG. 4 illustrates a block diagram of infrared sensor assembly 128 including an array of infrared sensors 132 in accordance with an embodiment of the disclosure. In the illustrated embodiment, infrared sensors 132 are provided as part of a unit cell array of a ROIC 402. ROIC 402 includes bias generation and timing control circuitry 404, column amplifiers 405, a column multiplexer 406, a row multiplexer 408, and an output amplifier 410. Image frames (e.g., thermal images) captured by infrared sensors 132 may be provided by output amplifier 410 to processing module 160, processor 195, and/or any other appropriate components to perform various processing techniques described herein. Although an 8 by 8 array is shown in FIG. 4, any desired array configuration may be used in other embodiments. Further descriptions of ROICs and infrared sensors (e.g., microbolometer circuits) may be found in U.S. Pat. No. 6,028,309 issued Feb. 22, 2000, which is incorporated herein by reference in its entirety.

Infrared sensor assembly 128 may capture images (e.g., image frames) and provide such images from its ROIC at various rates. Processing module 160 may be used to perform appropriate processing of captured infrared images and may be implemented in accordance with any appropriate architecture. In one embodiment, processing module 160 may be implemented as an ASIC. In this regard, such an ASIC may be configured to perform image processing with high performance and/or high efficiency. In another embodiment, processing module 160 may be implemented with a general purpose central processing unit (CPU) which may be configured to execute appropriate software instructions to perform image processing, coordinate and perform image processing with various image processing blocks, coordinate interfacing between processing module 160 and host device 102, and/or other operations. In yet another embodiment, processing module 160 may be implemented with a field programmable gate array (FPGA). Processing module 160 may be implemented with other types of processing and/or logic circuits in other embodiments as would be understood by one skilled in the art.

In these and other embodiments, processing module 160 may also be implemented with other components where appropriate, such as, volatile memory, non-volatile memory, and/or one or more interfaces (e.g., infrared detector interfaces, inter-integrated circuit (I2C) interfaces, mobile industry processor interfaces (MIPI), joint test action group (JTAG) interfaces (e.g., IEEE 1149.1 standard test access port and boundary-scan architecture), and/or other interfaces).

In some embodiments, infrared imaging module 100 may further include one or more actuators 199 which may be used to adjust the focus of infrared image frames captured by infrared sensor assembly 128. For example, actuators 199 may be used to move optical element 180, infrared sensors 132, and/or other components relative to each other to selectively focus and defocus infrared image frames in accordance with techniques described herein. Actuators 199 may be implemented in accordance with any type of motion-inducing apparatus or mechanism, and may positioned at any location within or external to infrared imaging module 100 as appropriate for different applications.

When infrared imaging module 100 is assembled, housing 120 may substantially enclose infrared sensor assembly 128, base 150, and processing module 160. Housing 120 may facilitate connection of various components of infrared imaging module 100. For example, in one embodiment, housing 120 may provide electrical connections 126 to connect various components as further described.

Electrical connections 126 (e.g., conductive electrical paths, traces, or other types of connections) may be electrically connected with bond pads 142 when infrared imaging module 100 is assembled. In various embodiments, electrical connections 126 may be embedded in housing 120, provided on inside surfaces of housing 120, and/or otherwise provided by housing 120. Electrical connections 126 may terminate in connections 124 protruding from the bottom surface of housing 120 as shown in FIG. 3. Connections 124 may connect with circuit board 170 when infrared imaging module 100 is assembled (e.g., housing 120 may rest atop circuit board 170 in various embodiments). Processing module 160 may be electrically connected with circuit board 170 through appropriate electrical connections. As a result, infrared sensor assembly 128 may be electrically connected with processing module 160 through, for example, conductive electrical paths provided by: bond pads 142, complementary connections on inside surfaces of housing 120, electrical connections 126 of housing 120, connections 124, and circuit board 170. Advantageously, such an arrangement may be implemented without requiring wire bonds to be provided between infrared sensor assembly 128 and processing module 160.

In various embodiments, electrical connections 126 in housing 120 may be made from any desired material (e.g., copper or any other appropriate conductive material). In one embodiment, electrical connections 126 may aid in dissipating heat from infrared imaging module 100.

Other connections may be used in other embodiments. For example, in one embodiment, sensor assembly 128 may be attached to processing module 160 through a ceramic board that connects to sensor assembly 128 by wire bonds and to processing module 160 by a ball grid array (BGA). In another embodiment, sensor assembly 128 may be mounted directly on a rigid flexible board and electrically connected with wire bonds, and processing module 160 may be mounted and connected to the rigid flexible board with wire bonds or a BGA.

The various implementations of infrared imaging module 100 and host device 102 set forth herein are provided for purposes of example, rather than limitation. In this regard, any of the various techniques described herein may be applied to any infrared camera system, infrared imager, or other device for performing infrared/thermal imaging.

Substrate 140 of infrared sensor assembly 128 may be mounted on base 150. In various embodiments, base 150 (e.g., a pedestal) may be made, for example, of copper formed by metal injection molding (MIM) and provided with a black oxide or nickel-coated finish. In various embodiments, base 150 may be made of any desired material, such as for example zinc, aluminum, or magnesium, as desired for a given application and may be formed by any desired applicable process, such as for example aluminum casting, MIM, or zinc rapid casting, as may be desired for particular applications. In various embodiments, base 150 may be implemented to provide structural support, various circuit paths, thermal heat sink properties, and other features where appropriate. In one embodiment, base 150 may be a multi-layer structure implemented at least in part using ceramic material.

In various embodiments, circuit board 170 may receive housing 120 and thus may physically support the various components of infrared imaging module 100. In various embodiments, circuit board 170 may be implemented as a printed circuit board (e.g., an FR4 circuit board or other types of circuit boards), a rigid or flexible interconnect (e.g., tape or other type of interconnects), a flexible circuit substrate, a flexible plastic substrate, or other appropriate structures. In various embodiments, base 150 may be implemented with the various features and attributes described for circuit board 170, and vice versa.

Socket 104 may include a cavity 106 configured to receive infrared imaging module 100 (e.g., as shown in the assembled view of FIG. 2). Infrared imaging module 100 and/or socket 104 may include appropriate tabs, arms, pins, fasteners, or any other appropriate engagement members which may be used to secure infrared imaging module 100 to or within socket 104 using friction, tension, adhesion, and/or any other appropriate manner. Socket 104 may include engagement members 107 that may engage surfaces 109 of housing 120 when infrared imaging module 100 is inserted into a cavity 106 of socket 104. Other types of engagement members may be used in other embodiments.

Infrared imaging module 100 may be electrically connected with socket 104 through appropriate electrical connections (e.g., contacts, pins, wires, or any other appropriate connections). For example, socket 104 may include electrical connections 108 which may contact corresponding electrical connections of infrared imaging module 100 (e.g., interconnect pads, contacts, or other electrical connections on side or bottom surfaces of circuit board 170, bond pads 142 or other electrical connections on base 150, or other connections). Electrical connections 108 may be made from any desired material (e.g., copper or any other appropriate conductive material). In one embodiment, electrical connections 108 may be mechanically biased to press against electrical connections of infrared imaging module 100 when infrared imaging module 100 is inserted into cavity 106 of socket 104. In one embodiment, electrical connections 108 may at least partially secure infrared imaging module 100 in socket 104. Other types of electrical connections may be used in other embodiments.

Socket 104 may be electrically connected with host device 102 through similar types of electrical connections. For example, in one embodiment, host device 102 may include electrical connections (e.g., soldered connections, snap-in connections, or other connections) that connect with electrical connections 108 passing through apertures 190. In various embodiments, such electrical connections may be made to the sides and/or bottom of socket 104.

Various components of infrared imaging module 100 may be implemented with flip chip technology which may be used to mount components directly to circuit boards without the additional clearances typically needed for wire bond connections. Flip chip connections may be used, as an example, to reduce the overall size of infrared imaging module 100 for use in compact small form factor applications. For example, in one embodiment, processing module 160 may be mounted to circuit board 170 using flip chip connections. For example, infrared imaging module 100 may be implemented with such flip chip configurations.

In various embodiments, infrared imaging module 100 and/or associated components may be implemented in accordance with various techniques (e.g., wafer level packaging techniques) as set forth in U.S. patent application Ser. No. 12/844,124 filed Jul. 27, 2010, and U.S. Provisional Patent Application No. 61/469,651 filed Mar. 30, 2011, which are incorporated herein by reference in their entirety. Furthermore, in accordance with one or more embodiments, infrared imaging module 100 and/or associated components may be implemented, calibrated, tested, and/or used in accordance with various techniques, such as for example as set forth in U.S. Pat. No. 7,470,902 issued Dec. 30, 2008, U.S. Pat. No. 6,028,309 issued Feb. 22, 2000, U.S. Pat. No. 6,812,465 issued Nov. 2, 2004, U.S. Pat. No. 7,034,301 issued Apr. 25, 2006, U.S. Pat. No. 7,679,048 issued Mar. 16, 2010, U.S. Pat. No. 7,470,904 issued Dec. 30, 2008, U.S. patent application Ser. No. 12/202,880 filed Sep. 2, 2008, and U.S. patent application Ser. No. 12/202,896 filed Sep. 2, 2008, which are incorporated herein by reference in their entirety.

Referring again to FIG. 1, in various embodiments, host device 102 may include shutter 105. In this regard, shutter 105 may be selectively positioned over socket 104 (e.g., as identified by arrows 103) while infrared imaging module 100 is installed therein. In this regard, shutter 105 may be used, for example, to protect infrared imaging module 100 when not in use. Shutter 105 may also be used as a temperature reference as part of a calibration process (e.g., a NUC process or other calibration processes) for infrared imaging module 100 as would be understood by one skilled in the art.

In various embodiments, shutter 105 may be made from various materials such as, for example, polymers, glass, aluminum (e.g., painted or anodized) or other materials. In various embodiments, shutter 105 may include one or more coatings to selectively filter electromagnetic radiation and/or adjust various optical properties of shutter 105 (e.g., a uniform blackbody coating or a reflective gold coating).

In another embodiment, shutter 105 may be fixed in place to protect infrared imaging module 100 at all times. In this case, shutter 105 or a portion of shutter 105 may be made from appropriate materials (e.g., polymers or infrared transmitting materials such as silicon, germanium, zinc selenide, or chalcogenide glasses) that do not substantially filter desired infrared wavelengths. In another embodiment, a shutter may be implemented as part of infrared imaging module 100 (e.g., within or as part of a lens barrel or other components of infrared imaging module 100), as would be understood by one skilled in the art.

Alternatively, in another embodiment, a shutter (e.g., shutter 105 or other type of external or internal shutter) need not be provided, but rather a NUC process or other type of calibration may be performed using shutterless techniques. In another embodiment, a NUC process or other type of calibration using shutterless techniques may be performed in combination with shutter-based techniques.

Infrared imaging module 100 and host device 102 may be implemented in accordance with any of the various techniques set forth in U.S. Provisional Patent Application No. 61/495,873 filed Jun. 10, 2011, U.S. Provisional Patent Application No. 61/495,879 filed Jun. 10, 2011, and U.S. Provisional Patent Application No. 61/495,888 filed Jun. 10, 2011, which are incorporated herein by reference in their entirety.

In various embodiments, the components of host device 102 and/or infrared imaging module 100 may be implemented as a local or distributed system with components in communication with each other over wired and/or wireless networks. Accordingly, the various operations identified in this disclosure may be performed by local and/or remote components as may be desired in particular implementations.

Figure 5:
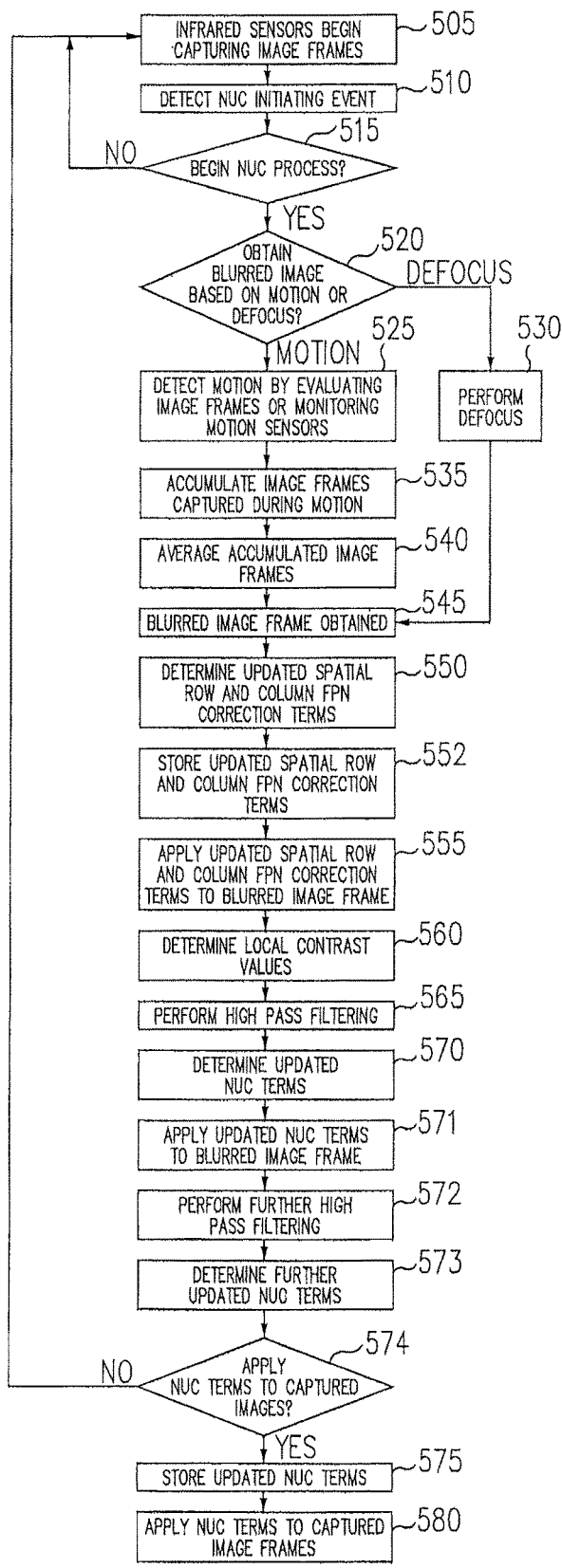
FIG. 5 illustrates a flow diagram of various operations to determine non-uniformity correction (NUC) terms in accordance with an embodiment of the disclosure.

FIG. 5 illustrates a flow diagram of various operations to determine NUC terms in accordance with an embodiment of the disclosure. In some embodiments, the operations of FIG. 5 may be performed by processing module 160 or processor 195 (both also generally referred to as a processor) operating on image frames captured by infrared sensors 132.

In block 505, infrared sensors 132 begin capturing image frames of a scene. Typically, the scene will be the real world environment in which host device 102 is currently located. In this regard, shutter 105 (if optionally provided) may be opened to permit infrared imaging module to receive infrared radiation from the scene. Infrared sensors 132 may continue capturing image frames during all operations shown in FIG. 5. In this regard, the continuously captured image frames may be used for various operations as further discussed. In one embodiment, the captured image frames may be temporally filtered (e.g., in accordance with the process of block 826 further described herein with regard to FIG. 8) and be processed by other terms (e.g., factory gain terms 812, factory offset terms 816, previously determined NUC terms 817, column FPN terms 820, and row FPN terms 824 as further described herein with regard to FIG. 8) before they are used in the operations shown in FIG. 5.

In block 510, a NUC process initiating event is detected. In one embodiment, the NUC process may be initiated in response to physical movement of host device 102. Such movement may be detected, for example, by motion sensors 194 which may be polled by a processor. In one example, a user may move host device 102 in a particular manner, such as by intentionally waving host device 102 back and forth in an "erase" or "swipe" movement. In this regard, the user may move host device 102 in accordance with a predetermined speed and direction (velocity), such as in an up and down, side to side, or other pattern to initiate the NUC process. In this example, the use of such movements may permit the user to intuitively operate host device 102 to simulate the "erasing" of noise in captured image frames.

In another example, a NUC process may be initiated by host device 102 if motion exceeding a threshold value is detected (e.g., motion greater than expected for ordinary use). It is contemplated that any desired type of spatial translation of host device 102 may be used to initiate the NUC process.

In yet another example, a NUC process may be initiated by host device 102 if a minimum time has elapsed since a previously performed NUC process. In a further example, a NUC process may be initiated by host device 102 if infrared imaging module 100 has experienced a minimum temperature change since a previously performed NUC process. In a still further example, a NUC process may be continuously initiated and repeated.

In block 515, after a NUC process initiating event is detected, it is determined whether the NUC process should actually be performed. In this regard, the NUC process may be selectively initiated based on whether one or more additional conditions are met. For example, in one embodiment, the NUC process may not be performed unless a minimum time has elapsed since a previously performed NUC process. In another embodiment, the NUC process may not be performed unless infrared imaging module 100 has experienced a minimum temperature change since a previously performed NUC process. Other criteria or conditions may be used in other embodiments. If appropriate criteria or conditions have been met, then the flow diagram continues to block 520. Otherwise, the flow diagram returns to block 505.

In the NUC process, blurred image frames may be used to determine NUC terms which may be applied to captured image frames to correct for FPN. As discussed, in one embodiment, the blurred image frames may be obtained by accumulating multiple image frames of a moving scene (e.g., captured while the scene and/or the thermal imager is in motion). In another embodiment, the blurred image frames may be obtained by defocusing an optical element or other component of the thermal imager.

Accordingly, in block 520 a choice of either approach is provided. If the motion-based approach is used, then the flow diagram continues to block 525. If the defocus-based approach is used, then the flow diagram continues to block 530.

Referring now to the motion-based approach, in block 525 motion is detected. For example, in one embodiment, motion may be detected based on the image frames captured by infrared sensors 132. In this regard, an appropriate motion detection process (e.g., an image registration process, a frame-to-frame difference calculation, or other appropriate process) may be applied to captured image frames to determine whether motion is present (e.g., whether static or moving image frames have been captured). For example, in one embodiment, it can be determined whether pixels or regions around the pixels of consecutive image frames have changed more than a user defined amount (e.g., a percentage and/or threshold value). If at least a given percentage of pixels have changed by at least the user defined amount, then motion will be detected with sufficient certainty to proceed to block 535.

In another embodiment, motion may be determined on a per pixel basis, wherein only pixels that exhibit significant changes are accumulated to provide the blurred image frame. For example, counters may be provided for each pixel and used to ensure that the same number of pixel values are accumulated for each pixel, or used to average the pixel values based on the number of pixel values actually accumulated for each pixel. Other types of image-based motion detection may be performed such as performing a Radon transform.

In another embodiment, motion may be detected based on data provided by motion sensors 194. In one embodiment, such motion detection may include detecting whether host device 102 is moving along a relatively straight trajectory through space. For example, if host device 102 is moving along a relatively straight trajectory, then it is possible that certain objects appearing in the imaged scene may not be sufficiently blurred (e.g., objects in the scene that may be aligned with or moving substantially parallel to the straight trajectory). Thus, in such an embodiment, the motion detected by motion sensors 194 may be conditioned on host device 102 exhibiting, or not exhibiting, particular trajectories.

In yet another embodiment, both a motion detection process and motion sensors 194 may be used. Thus, using any of these various embodiments, a determination can be made as to whether or not each image frame was captured while at least a portion of the scene and host device 102 were in motion relative to each other (e.g., which may be caused by host device 102 moving relative to the scene, at least a portion of the scene moving relative to host device 102, or both).

It is expected that the image frames for which motion was detected may exhibit some secondary blurring of the captured scene (e.g., blurred thermal image data associated with the scene) due to the thermal time constants of infrared sensors 132 (e.g., microbolometer thermal time constants) interacting with the scene movement.

In block 535, image frames for which motion was detected are accumulated. For example, if motion is detected for a continuous series of image frames, then the image frames of the series may be accumulated. As another example, if motion is detected for only some image frames, then the non-moving image frames may be skipped and not included in the accumulation. Thus, a continuous or discontinuous set of image frames may be selected to be accumulated based on the detected motion.

In block 540, the accumulated image frames are averaged to provide a blurred image frame. Because the accumulated image frames were captured during motion, it is expected that actual scene information will vary between the image frames and thus cause the scene information to be further blurred in the resulting blurred image frame (block 545).

In contrast, FPN (e.g., caused by one or more components of infrared imaging module 100) will remain fixed over at least short periods of time and over at least limited changes in scene irradiance during motion. As a result, image frames captured in close proximity in time and space during motion will suffer from identical or at least very similar FPN. Thus, although scene information may change in consecutive image frames, the FPN will stay essentially constant. By averaging, multiple image frames captured during motion will blur the scene information, but will not blur the FPN. As a result, FPN will remain more clearly defined in the blurred image frame provided in block 545 than the scene information.

In one embodiment, 32 or more image frames are accumulated and averaged in blocks 535 and 540. However, any desired number of image frames may be used in other embodiments, but with generally decreasing correction accuracy as frame count is decreased.

Referring now to the defocus-based approach, in block 530, a defocus operation may be performed to intentionally defocus the image frames captured by infrared sensors 132. For example, in one embodiment, one or more actuators 199 may be used to adjust, move, or otherwise translate optical element 180, infrared sensor assembly 128, and/or other components of infrared imaging module 100 to cause infrared sensors 132 to capture a blurred (e.g., unfocused) image frame of the scene. Other non-actuator based techniques are also contemplated for intentionally defocusing infrared image frames such as, for example, manual (e.g., user-initiated) defocusing.

Although the scene may appear blurred in the image frame, FPN (e.g., caused by one or more components of infrared imaging module 100) will remain unaffected by the defocusing operation. As a result, a blurred image frame of the scene will be provided (block 545) with FPN remaining more clearly defined in the blurred image than the scene information.

In the above discussion, the defocus-based approach has been described with regard to a single captured image frame. In another embodiment, the defocus-based approach may include accumulating multiple image frames while the infrared imaging module 100 has been defocused and averaging the defocused image frames to remove the effects of temporal noise and provide a blurred image frame in block 545.

Thus, it will be appreciated that a blurred image frame may be provided in block 545 by either the motion-based approach or the defocus-based approach. Because much of the scene information will be blurred by either motion, defocusing, or both, the blurred image frame may be effectively considered a low pass filtered version of the original captured image frames with respect to scene information.

In block 550, the blurred image frame is processed to determine updated row and column FPN terms (e.g., if row and column FPN terms have not been previously determined then the updated row and column FPN terms may be new row and column FPN terms in the first iteration of block 550). As used in this disclosure, the terms row and column may be used interchangeably depending on the orientation of infrared sensors 132 and/or other components of infrared imaging module 100.

In one embodiment, block 550 includes determining a spatial FPN correction term for each row of the blurred image frame (e.g., each row may have its own spatial FPN correction term), and also determining a spatial FPN correction term for each column of the blurred image frame (e.g., each column may have its own spatial FPN correction term). Such processing may be used to reduce the spatial and slowly varying (1/f) row and column FPN inherent in thermal imagers caused by, for example, 1/f noise characteristics of amplifiers in ROIC 402 which may manifest as vertical and horizontal stripes in images frames.

Advantageously, by determining spatial row and column FPN terms using the blurred image frame, there will be a reduced risk of vertical and horizontal objects in the actual imaged scene from being mistaken for row and column noise (e.g., real scene content will be blurred while FPN remains unblurred).

Figure 6:
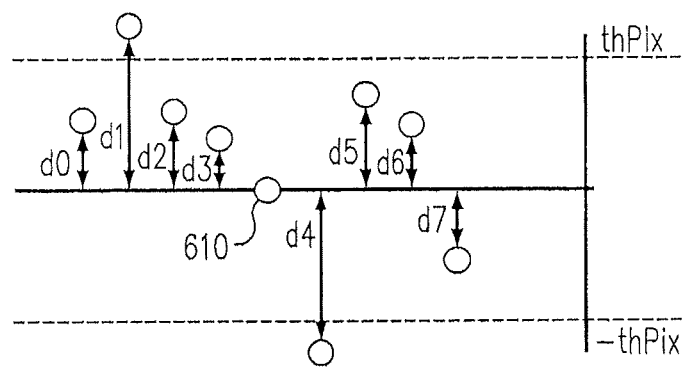
FIG. 6 illustrates differences between neighboring pixels in accordance with an embodiment of the disclosure.

In one embodiment, row and column FPN terms may be determined by considering differences between neighboring pixels of the blurred image frame. For example, FIG. 6 illustrates differences between neighboring pixels in accordance with an embodiment of the disclosure. Specifically, in FIG. 6 a pixel 610 is compared to its 8 nearest horizontal neighbors: d0-d3 on one side and d4-d7 on the other side. Differences between the neighbor pixels can be averaged to obtain an estimate of the offset error of the illustrated group of pixels. An offset error may be calculated for each pixel in a row or column and the average result may be used to correct the entire row or column.

To prevent real scene data from being interpreted as noise, upper and lower threshold values may be used (thPix and −thPix). Pixel values falling outside these threshold values (pixels d1 and d4 in this example) are not used to obtain the offset error. In addition, the maximum amount of row and column FPN correction may be limited by these threshold values.

Further techniques for performing spatial row and column FPN correction processing are set forth in U.S. patent application Ser. No. 12/396,340 filed Mar. 2, 2009 which is incorporated herein by reference in its entirety.

Referring again to FIG. 5, the updated row and column FPN terms determined in block 550 are stored (block 552) and applied (block 555) to the blurred image frame provided in block 545. After these terms are applied, some of the spatial row and column FPN in the blurred image frame may be reduced. However, because such terms are applied generally to rows and columns, additional FPN may remain such as spatially uncorrelated FPN associated with pixel to pixel drift or other causes. Neighborhoods of spatially correlated FPN may also remain which may not be directly associated with individual rows and columns. Accordingly, further processing may be performed as discussed below to determine NUC terms.

In block 560, local contrast values (e.g., edges or absolute values of gradients between adjacent or small groups of pixels) in the blurred image frame are determined. If scene information in the blurred image frame includes contrasting areas that have not been significantly blurred (e.g., high contrast edges in the original scene data), then such features may be identified by a contrast determination process in block 560.

For example, local contrast values in the blurred image frame may be calculated, or any other desired type of edge detection process may be applied to identify certain pixels in the blurred image as being part of an area of local contrast. Pixels that are marked in this manner may be considered as containing excessive high spatial frequency scene information that would be interpreted as FPN (e.g., such regions may correspond to portions of the scene that have not been sufficiently blurred). As such, these pixels may be excluded from being used in the further determination of NUC terms. In one embodiment, such contrast detection processing may rely on a threshold that is higher than the expected contrast value associated with FPN (e.g., pixels exhibiting a contrast value higher than the threshold may be considered to be scene information, and those lower than the threshold may be considered to be exhibiting FPN).

In one embodiment, the contrast determination of block 560 may be performed on the blurred image frame after row and column FPN terms have been applied to the blurred image frame (e.g., as shown in FIG. 5). In another embodiment, block 560 may be performed prior to block 550 to determine contrast before row and column FPN terms are determined (e.g., to prevent scene based contrast from contributing to the determination of such terms).

Following block 560, it is expected that any high spatial frequency content remaining in the blurred image frame may be generally attributed to spatially uncorrelated FPN. In this regard, following block 560, much of the other noise or actual desired scene based information has been removed or excluded from the blurred image frame due to: intentional blurring of the image frame (e.g., by motion or defocusing in blocks 520 through 545), application of row and column FPN terms (block 555), and contrast determination (block 560).

Thus, it can be expected that following block 560, any remaining high spatial frequency content (e.g., exhibited as areas of contrast or differences in the blurred image frame) may be attributed to spatially uncorrelated FPN. Accordingly, in block 565, the blurred image frame is high pass filtered. In one embodiment, this may include applying a high pass filter to extract the high spatial frequency content from the blurred image frame. In another embodiment, this may include applying a low pass filter to the blurred image frame and taking a difference between the low pass filtered image frame and the unfiltered blurred image frame to obtain the high spatial frequency content. In accordance with various embodiments of the present disclosure, a high pass filter may be implemented by calculating a mean difference between a sensor signal (e.g., a pixel value) and its neighbors.

In block 570, a flat field correction process is performed on the high pass filtered blurred image frame to determine updated NUC terms (e.g., if a NUC process has not previously been performed then the updated NUC terms may be new NUC terms in the first iteration of block 570).

Figure 7:
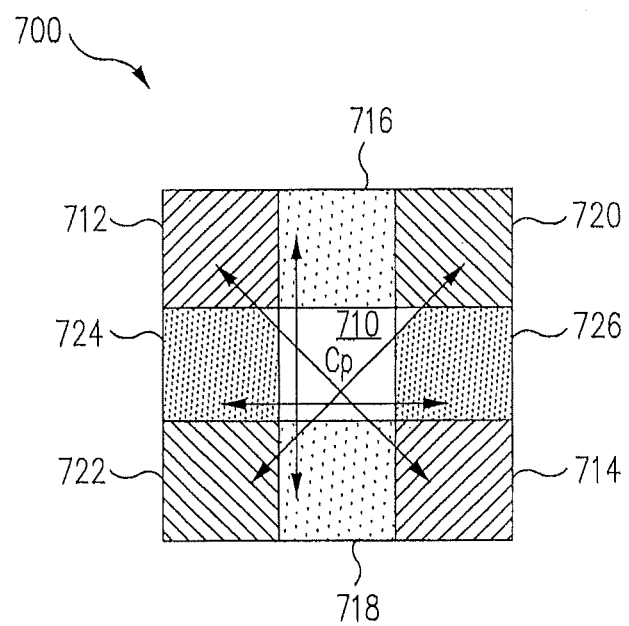
FIG. 7 illustrates a flat field correction technique in accordance with an embodiment of the disclosure.

For example, FIG. 7 illustrates a flat field correction technique 700 in accordance with an embodiment of the disclosure. In FIG. 7, a NUC term may be determined for each pixel 710 of the blurred image frame using the values of its neighboring pixels 712 to 726. For each pixel 710, several gradients may be determined based on the absolute difference between the values of various adjacent pixels. For example, absolute value differences may be determined between: pixels 712 and 714 (a left to right diagonal gradient), pixels 716 and 718 (a top to bottom vertical gradient), pixels 720 and 722 (a right to left diagonal gradient), and pixels 724 and 726 (a left to right horizontal gradient).

These absolute differences may be summed to provide a summed gradient for pixel 710. A weight value may be determined for pixel 710 that is inversely proportional to the summed gradient. This process may be performed for all pixels 710 of the blurred image frame until a weight value is provided for each pixel 710. For areas with low gradients (e.g., areas that are blurry or have low contrast), the weight value will be close to one. Conversely, for areas with high gradients, the weight value will be zero or close to zero. The update to the NUC term as estimated by the high pass filter is multiplied with the weight value.

In one embodiment, the risk of introducing scene information into the NUC terms can be further reduced by applying some amount of temporal damping to the NUC term determination process. For example, a temporal damping factor $\lambda$ between 0 and 1 may be chosen such that the new NUC term ($NUC_{NEW}$) stored is a weighted average of the old NUC term ($NUC_{OLD}$) and the estimated updated NUC term ($NUC_{UPDATE}$). In one embodiment, this can be expressed as $NUC_{NEW} = \lambda \cdot NUC_{OLD} + (1-\lambda) \cdot (NUC_{OLD} + NUC_{UPDATE})$.

Although the determination of NUC terms has been described with regard to gradients, local contrast values may be used instead where appropriate. Other techniques may also be used such as, for example, standard deviation calculations. Other types flat field correction processes may be performed to determine NUC terms including, for example, various processes identified in U.S. Pat. No. 6,028,309 issued Feb. 22, 2000, U.S. Pat. No. 6,812,465 issued Nov. 2, 2004, and U.S. patent application Ser. No. 12/114,865 filed May 5, 2008, which are incorporated herein by reference in their entirety.

Referring again to FIG. 5, block 570 may include additional processing of the NUC terms. For example, in one embodiment, to preserve the scene signal mean, the sum of all NUC terms may be normalized to zero by subtracting the NUC term mean from each NUC term. Also in block 570, to avoid row and column noise from affecting the NUC terms, the mean value of each row and column may be subtracted from the NUC terms for each row and column. As a result, row and column FPN filters using the row and column FPN terms determined in block 550 may be better able to filter out row and column noise in further iterations (e.g., as further shown in FIG. 8) after the NUC terms are applied to captured images (e.g., in block 580 further discussed herein). In this regard, the row and column FPN filters may in general use more data to calculate the per row and per column offset coefficients (e.g., row and column FPN terms) and may thus provide a more robust alternative for reducing spatially correlated FPN than the NUC terms which are based on high pass filtering to capture spatially uncorrelated noise.

In blocks 571-573, additional high pass filtering and further determinations of updated NUC terms may be optionally performed to remove spatially correlated FPN with lower spatial frequency than previously removed by row and column FPN terms. In this regard, some variability in infrared sensors 132 or other components of infrared imaging module 100 may result in spatially correlated FPN noise that cannot be easily modeled as row or column noise. Such spatially correlated FPN may include, for example, window defects on a sensor package or a cluster of infrared sensors 132 that respond differently to irradiance than neighboring infrared sensors 132. In one embodiment, such spatially correlated FPN may be mitigated with an offset correction. If the amount of such spatially correlated FPN is significant, then the noise may also be detectable in the blurred image frame. Since this type of noise may affect a neighborhood of pixels, a high pass filter with a small kernel may not detect the FPN in the neighborhood (e.g., all values used in high pass filter may be taken from the neighborhood of affected pixels and thus may be affected by the same offset error). For example, if the high pass filtering of block 565 is performed with a small kernel (e.g., considering only immediately adjacent pixels that fall within a neighborhood of pixels affected by spatially correlated FPN), then broadly distributed spatially correlated FPN may not be detected.

Figure 11:
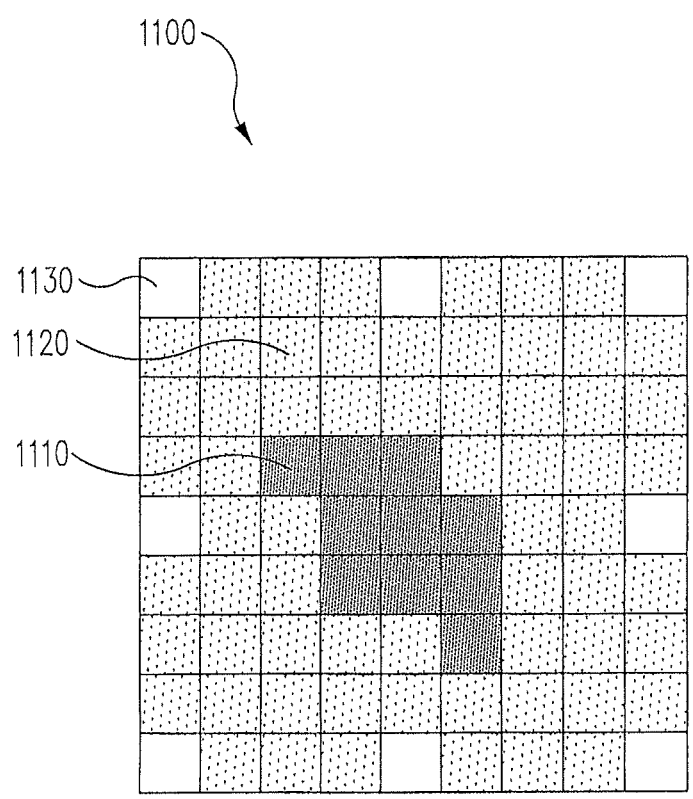
FIG. 11 illustrates spatially correlated fixed pattern noise (FPN) in a neighborhood of pixels in accordance with an embodiment of the disclosure.

For example, FIG. 11 illustrates spatially correlated FPN in a neighborhood of pixels in accordance with an embodiment of the disclosure. As shown in a sample image frame 1100, a neighborhood of pixels 1110 may exhibit spatially correlated FPN that is not precisely correlated to individual rows and columns and is distributed over a neighborhood of several pixels (e.g., a neighborhood of approximately 4 by 4 pixels in this example). Sample image frame 1100 also includes a set of pixels 1120 exhibiting substantially uniform response that are not used in filtering calculations, and a set of pixels 1130 that are used to estimate a low pass value for the neighborhood of pixels 1110. In one embodiment, pixels 1130 may be a number of pixels divisible by two in order to facilitate efficient hardware or software calculations.

Referring again to FIG. 5, in blocks 571-573, additional high pass filtering and further determinations of updated NUC terms may be optionally performed to remove spatially correlated FPN such as exhibited by pixels 1110. In block 571, the updated NUC terms determined in block 570 are applied to the blurred image frame. Thus, at this time, the blurred image frame will have been initially corrected for spatially correlated FPN (e.g., by application of the updated row and column FPN terms in block 555), and also initially corrected for spatially uncorrelated FPN (e.g., by application of the updated NUC terms applied in block 571).

In block 572, a further high pass filter is applied with a larger kernel than was used in block 565, and further updated NUC terms may be determined in block 573. For example, to detect the spatially correlated FPN present in pixels 1110, the high pass filter applied in block 572 may include data from a sufficiently large enough neighborhood of pixels such that differences can be determined between unaffected pixels (e.g., pixels 1120) and affected pixels (e.g., pixels 1110). For example, a low pass filter with a large kernel can be used (e.g., an N by N kernel that is much greater than 3 by 3 pixels) and the results may be subtracted to perform appropriate high pass filtering.

In one embodiment, for computational efficiency, a sparse kernel may be used such that only a small number of neighboring pixels inside an N by N neighborhood are used. For any given high pass filter operation using distant neighbors (e.g., a large kernel), there is a risk of modeling actual (potentially blurred) scene information as spatially correlated FPN. Accordingly, in one embodiment, the temporal damping factor $\lambda$ may be set close to 1 for updated NUC terms determined in block 573.

In various embodiments, blocks 571-573 may be repeated (e.g., cascaded) to iteratively perform high pass filtering with increasing kernel sizes to provide further updated NUC terms further correct for spatially correlated FPN of desired neighborhood sizes. In one embodiment, the decision to perform such iterations may be determined by whether spatially correlated FPN has actually been removed by the updated NUC terms of the previous performance of blocks 571-573.

After blocks 571-573 are finished, a decision is made regarding whether to apply the updated NUC terms to captured image frames (block 574). For example, if an average of the absolute value of the NUC terms for the entire image frame is less than a minimum threshold value, or greater than a maximum threshold value, the NUC terms may be deemed spurious or unlikely to provide meaningful correction. Alternatively, thresholding criteria may be applied to individual pixels to determine which pixels receive updated NUC terms. In one embodiment, the threshold values may correspond to differences between the newly calculated NUC terms and previously calculated NUC terms. In another embodiment, the threshold values may be independent of previously calculated NUC terms. Other tests may be applied (e.g., spatial correlation tests) to determine whether the NUC terms should be applied.

If the NUC terms are deemed spurious or unlikely to provide meaningful correction, then the flow diagram returns to block 505. Otherwise, the newly determined NUC terms are stored (block 575) to replace previous NUC terms (e.g., determined by a previously performed iteration of FIG. 5) and applied (block 580) to captured image frames.

Figure 8:
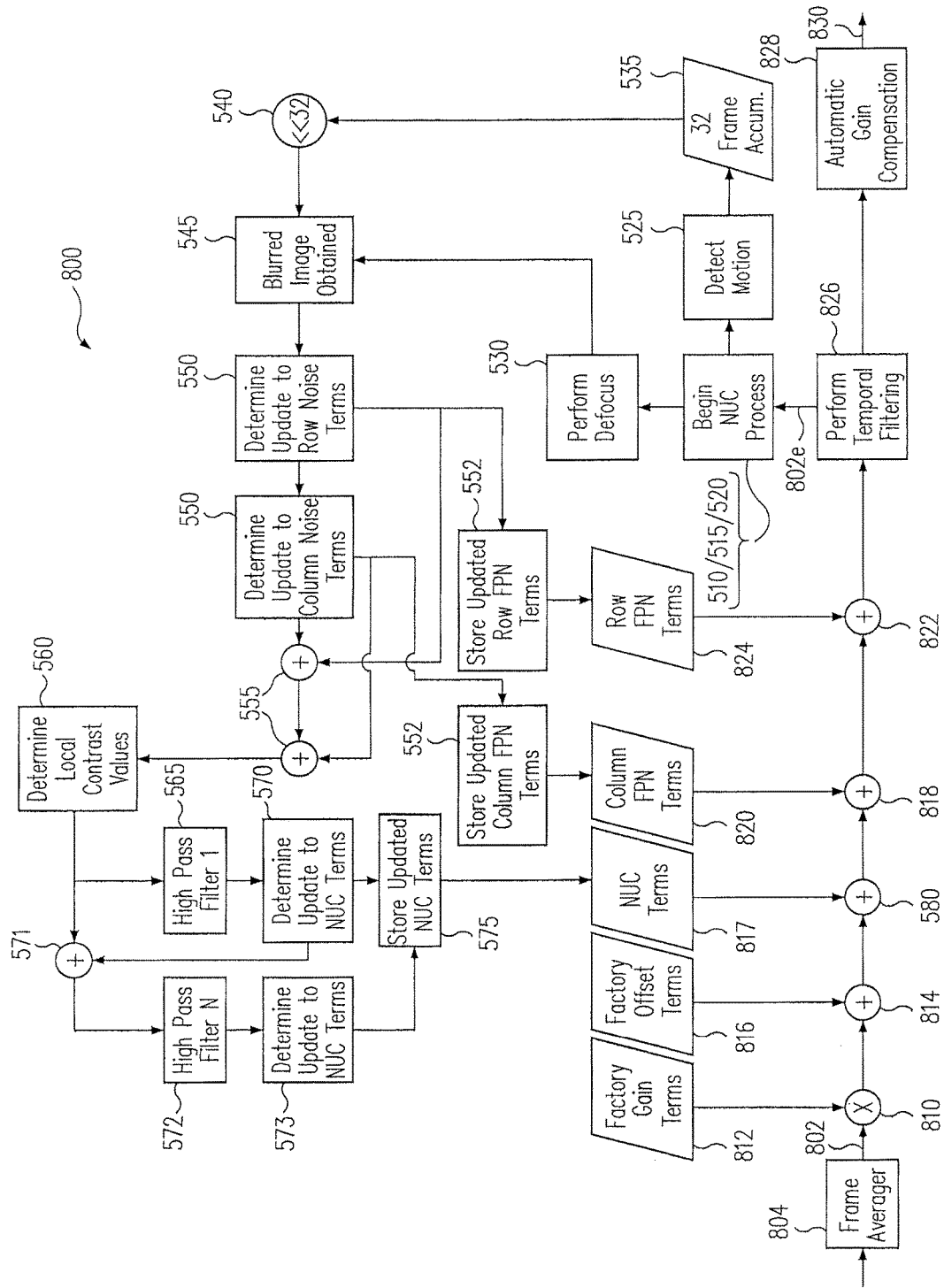
FIG. 8 illustrates various image processing techniques of FIG. 5 and other operations applied in an image processing pipeline in accordance with an embodiment of the disclosure.

FIG. 8 illustrates various image processing techniques of FIG. 5 and other operations applied in an image processing pipeline 800 in accordance with an embodiment of the disclosure. In this regard, pipeline 800 identifies various operations of FIG. 5 in the context of an overall iterative image processing scheme for correcting image frames provided by infrared imaging module 100. In some embodiments, pipeline 800 may be provided by processing module 160 or processor 195 (both also generally referred to as a processor) operating on image frames captured by infrared sensors 132.

Image frames captured by infrared sensors 132 may be provided to a frame averager 804 that integrates multiple image frames to provide image frames 802 with an improved signal to noise ratio. Frame averager 804 may be effectively provided by infrared sensors 132, ROIC 402, and other components of infrared sensor assembly 128 that are implemented to support high image capture rates. For example, in one embodiment, infrared sensor assembly 128 may capture infrared image frames at a frame rate of 240 Hz (e.g., 240 images per second). In this embodiment, such a high frame rate may be implemented, for example, by operating infrared sensor assembly 128 at relatively low voltages (e.g., compatible with mobile telephone voltages) and by using a relatively small array of infrared sensors 132 (e.g., an array of 64 by 64 infrared sensors in one embodiment).

In one embodiment, such infrared image frames may be provided from infrared sensor assembly 128 to processing module 160 at a high frame rate (e.g., 240 Hz or other frame rates). In another embodiment, infrared sensor assembly 128 may integrate over longer time periods, or multiple time periods, to provide integrated (e.g., averaged) infrared image frames to processing module 160 at a lower frame rate (e.g., 30 Hz, 9 Hz, or other frame rates). Further information regarding implementations that may be used to provide high image capture rates may be found in U.S. Provisional Patent Application No. 61/495,879 previously referenced herein.

Image frames 802 proceed through pipeline 800 where they are adjusted by various terms, temporally filtered, used to determine the various adjustment terms, and gain compensated.

In blocks 810 and 814, factory gain terms 812 and factory offset terms 816 are applied to image frames 802 to compensate for gain and offset differences, respectively, between the various infrared sensors 132 and/or other components of infrared imaging module 100 determined during manufacturing and testing.

In block 580, NUC terms 817 are applied to image frames 802 to correct for FPN as discussed. In one embodiment, if NUC terms 817 have not yet been determined (e.g., before a NUC process has been initiated), then block 580 may not be performed or initialization values may be used for NUC terms 817 that result in no alteration to the image data (e.g., offsets for every pixel would be equal to zero).

In blocks 818 and 822, column FPN terms 820 and row FPN terms 824, respectively, are applied to image frames 802. Column FPN terms 820 and row FPN terms 824 may be determined in accordance with block 550 as discussed. In one embodiment, if the column FPN terms 820 and row FPN terms 824 have not yet been determined (e.g., before a NUC process has been initiated), then blocks 818 and 822 may not be performed or initialization values may be used for the column FPN terms 820 and row FPN terms 824 that result in no alteration to the image data (e.g., offsets for every pixel would be equal to zero).

Figure 9:
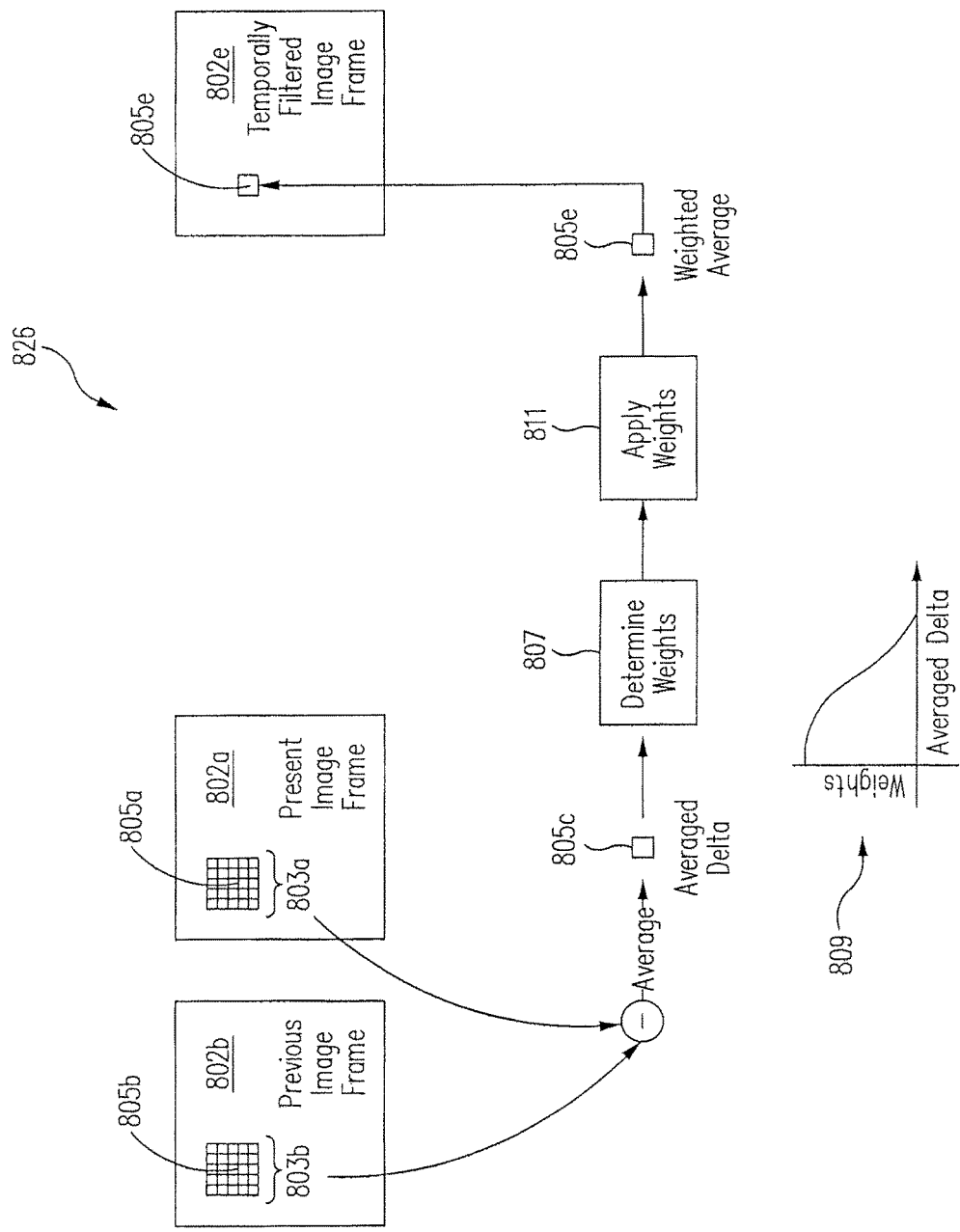
FIG. 9 illustrates a temporal noise reduction process in accordance with an embodiment of the disclosure.

In block 826, temporal filtering is performed on image frames 802 in accordance with a temporal noise reduction (TNR) process. FIG. 9 illustrates a TNR process in accordance with an embodiment of the disclosure. In FIG. 9, a presently received image frame 802a and a previously temporally filtered image frame 802b are processed to determine a new temporally filtered image frame 802e. Image frames 802a and 802b include local neighborhoods of pixels 803a and 803b centered around pixels 805a and 805b, respectively. Neighborhoods 803a and 803b correspond to the same locations within image frames 802a and 802b and are subsets of the total pixels in image frames 802a and 802b. In the illustrated embodiment, neighborhoods 803a and 803b include areas of 5 by 5 pixels. Other neighborhood sizes may be used in other embodiments.

Differences between corresponding pixels of neighborhoods 803a and 803b are determined and averaged to provide an averaged delta value 805c for the location corresponding to pixels 805a and 805b. Averaged delta value 805c may be used to determine weight values in block 807 to be applied to pixels 805a and 805b of image frames 802a and 802b.

In one embodiment, as shown in graph 809, the weight values determined in block 807 may be inversely proportional to averaged delta value 805c such that weight values drop rapidly towards zero when there are large differences between neighborhoods 803a and 803b. In this regard, large differences between neighborhoods 803a and 803b may indicate that changes have occurred within the scene (e.g., due to motion) and pixels 802a and 802b may be appropriately weighted, in one embodiment, to avoid introducing blur across frame-to-frame scene changes. Other associations between weight values and averaged delta value 805c may be used in various embodiments.

The weight values determined in block 807 may be applied to pixels 805a and 805b to determine a value for corresponding pixel 805e of image frame 802e (block 811). In this regard, pixel 805e may have a value that is a weighted average (or other combination) of pixels 805a and 805b, depending on averaged delta value 805c and the weight values determined in block 807.

For example, pixel 805e of temporally filtered image frame 802e may be a weighted sum of pixels 805a and 805b of image frames 802a and 802b. If the average difference between pixels 805a and 805b is due to noise, then it may be expected that the average change between neighborhoods 805a and 805b will be close to zero (e.g., corresponding to the average of uncorrelated changes). Under such circumstances, it may be expected that the sum of the differences between neighborhoods 805a and 805b will be close to zero. In this case, pixel 805a of image frame 802a may both be appropriately weighted so as to contribute to the value of pixel 805e.

However, if the sum of such differences is not zero (e.g., even differing from zero by a small amount in one embodiment), then the changes may be interpreted as being attributed to motion instead of noise. Thus, motion may be detected based on the average change exhibited by neighborhoods 805a and 805b. Under these circumstances, pixel 805a of image frame 802a may be weighted heavily, while pixel 805b of image frame 802b may be weighted lightly.

Other embodiments are also contemplated. For example, although averaged delta value 805c has been described as being determined based on neighborhoods 805a and 805b, in other embodiments averaged delta value 805c may be determined based on any desired criteria (e.g., based on individual pixels or other types of groups of sets of pixels).

In the above embodiments, image frame 802a has been described as a presently received image frame and image frame 802b has been described as a previously temporally filtered image frame. In another embodiment, image frames 802a and 802b may be first and second image frames captured by infrared imaging module 100 that have not been temporally filtered.

Figure 10:
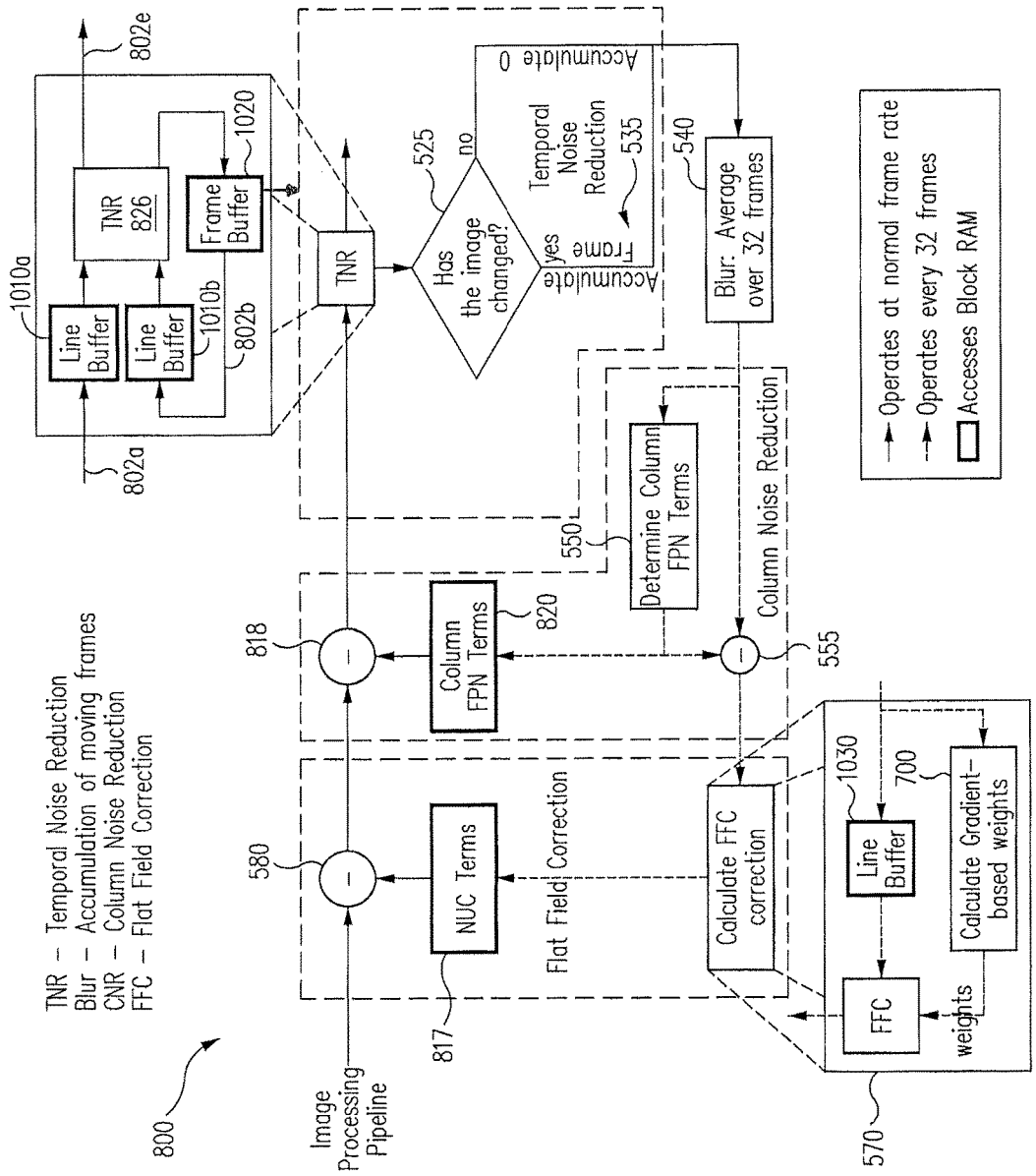
FIG. 10 illustrates particular implementation details of several processes of the image processing pipeline of FIG. 8 in accordance with an embodiment of the disclosure.

FIG. 10 illustrates further implementation details in relation to the TNR process of block 826. As shown in FIG. 10, image frames 802a and 802b may be read into line buffers 1010a and 1010b, respectively, and image frame 802b (e.g., the previous image frame) may be stored in a frame buffer 1020 before being read into line buffer 1010b. In one embodiment, line buffers 1010a-b and frame buffer 1020 may be implemented by a block of random access memory (RAM) provided by any appropriate component of infrared imaging module 100 and/or host device 102.

Referring again to FIG. 8, image frame 802e may be passed to an automatic gain compensation block 828 for further processing to provide a result image frame 830 that may be used by host device 102 as desired.

FIG. 8 further illustrates various operations that may be performed to determine row and column FPN terms and NUC terms as discussed. In one embodiment, these operations may use image frames 802e as shown in FIG. 8. Because image frames 802e have already been temporally filtered, at least some temporal noise may be removed and thus will not inadvertently affect the determination of row and column FPN terms 824 and 820 and NUC terms 817. In another embodiment, non-temporally filtered image frames 802 may be used.

In FIG. 8, blocks 510, 515, and 520 of FIG. 5 are collectively represented together. As discussed, a NUC process may be selectively initiated and performed in response to various NUC process initiating events and based on various criteria or conditions. As also discussed, the NUC process may be performed in accordance with a motion-based approach (blocks 525, 535, and 540) or a defocus-based approach (block 530) to provide a blurred image frame (block 545). FIG. 8 further illustrates various additional blocks 550, 552, 555, 560, 565, 570, 571, 572, 573, and 575 previously discussed with regard to FIG. 5.

As shown in FIG. 8, row and column FPN terms 824 and 820 and NUC terms 817 may be determined and applied in an iterative fashion such that updated terms are determined using image frames 802 to which previous terms have already been applied. As a result, the overall process of FIG. 8 may repeatedly update and apply such terms to continuously reduce the noise in image frames 830 to be used by host device 102.

Referring again to FIG. 10, further implementation details are illustrated for various blocks of FIGS. 5 and 8 in relation to pipeline 800. For example, blocks 525, 535, and 540 are shown as operating at the normal frame rate of image frames 802 received by pipeline 800. In the embodiment shown in FIG. 10, the determination made in block 525 is represented as a decision diamond used to determine whether a given image frame 802 has sufficiently changed such that it may be considered an image frame that will enhance the blur if added to other image frames and is therefore accumulated (block 535 is represented by an arrow in this embodiment) and averaged (block 540).

Also in FIG. 10, the determination of column FPN terms 820 (block 550) is shown as operating at an update rate that in this example is ⅟32 of the sensor frame rate (e.g., normal frame rate) due to the averaging performed in block 540. Other update rates may be used in other embodiments. Although only column FPN terms 820 are identified in FIG. 10, row FPN terms 824 may be implemented in a similar fashion at the reduced frame rate.

FIG. 10 also illustrates further implementation details in relation to the NUC determination process of block 570. In this regard, the blurred image frame may be read to a line buffer 1030 (e.g., implemented by a block of RAM provided by any appropriate component of infrared imaging module 100 and/or host device 102). The flat field correction technique 700 of FIG. 7 may be performed on the blurred image frame.

In view of the present disclosure, it will be appreciated that techniques described herein may be used to remove various types of FPN (e.g., including very high amplitude FPN) such as spatially correlated row and column FPN and spatially uncorrelated FPN.

Other embodiments are also contemplated. For example, in one embodiment, the rate at which row and column FPN terms and/or NUC terms are updated can be inversely proportional to the estimated amount of blur in the blurred image frame and/or inversely proportional to the magnitude of local contrast values (e.g., determined in block 560).

In various embodiments, the described techniques may provide advantages over conventional shutter-based noise correction techniques. For example, by using a shutterless process, a shutter (e.g., such as shutter 105) need not be provided, thus permitting reductions in size, weight, cost, and mechanical complexity. Power and maximum voltage supplied to, or generated by, infrared imaging module 100 may also be reduced if a shutter does not need to be mechanically operated. Reliability will be improved by removing the shutter as a potential point of failure. A shutterless process also eliminates potential image interruption caused by the temporary blockage of the imaged scene by a shutter.

Also, by correcting for noise using intentionally blurred image frames captured from a real world scene (not a uniform scene provided by a shutter), noise correction may be performed on image frames that have irradiance levels similar to those of the actual scene desired to be imaged. This can improve the accuracy and effectiveness of noise correction terms determined in accordance with the various described techniques.

In some embodiments, infrared imaging module 100 may be configured to operate at low voltage levels. In particular, infrared imaging module 100 may be implemented with circuitry configured to operate at low power and/or in accordance with other parameters that permit infrared imaging module 100 to be conveniently and effectively implemented in various types of host devices 102, such as mobile devices and other devices.

For example, infrared imaging module 100 may include a low dropout regulator (LDO) (e.g., on the same chip and/or wafer level package as the ROIC). For example, an LDO may be provided as part of an FPA with infrared sensor assembly 128. As discussed, such implementations may reduce power supply noise introduced to infrared sensor assembly 128 and thus provide an improved PSRR. In addition, by implementing the LDO with the ROIC, less die area may be consumed and fewer discrete die (or chips) are needed. Also, in some embodiments, the use of an LDO may reduce or eliminate the need for a separate negative reference voltage to be provided to infrared sensor assembly 128.

Figure 12:
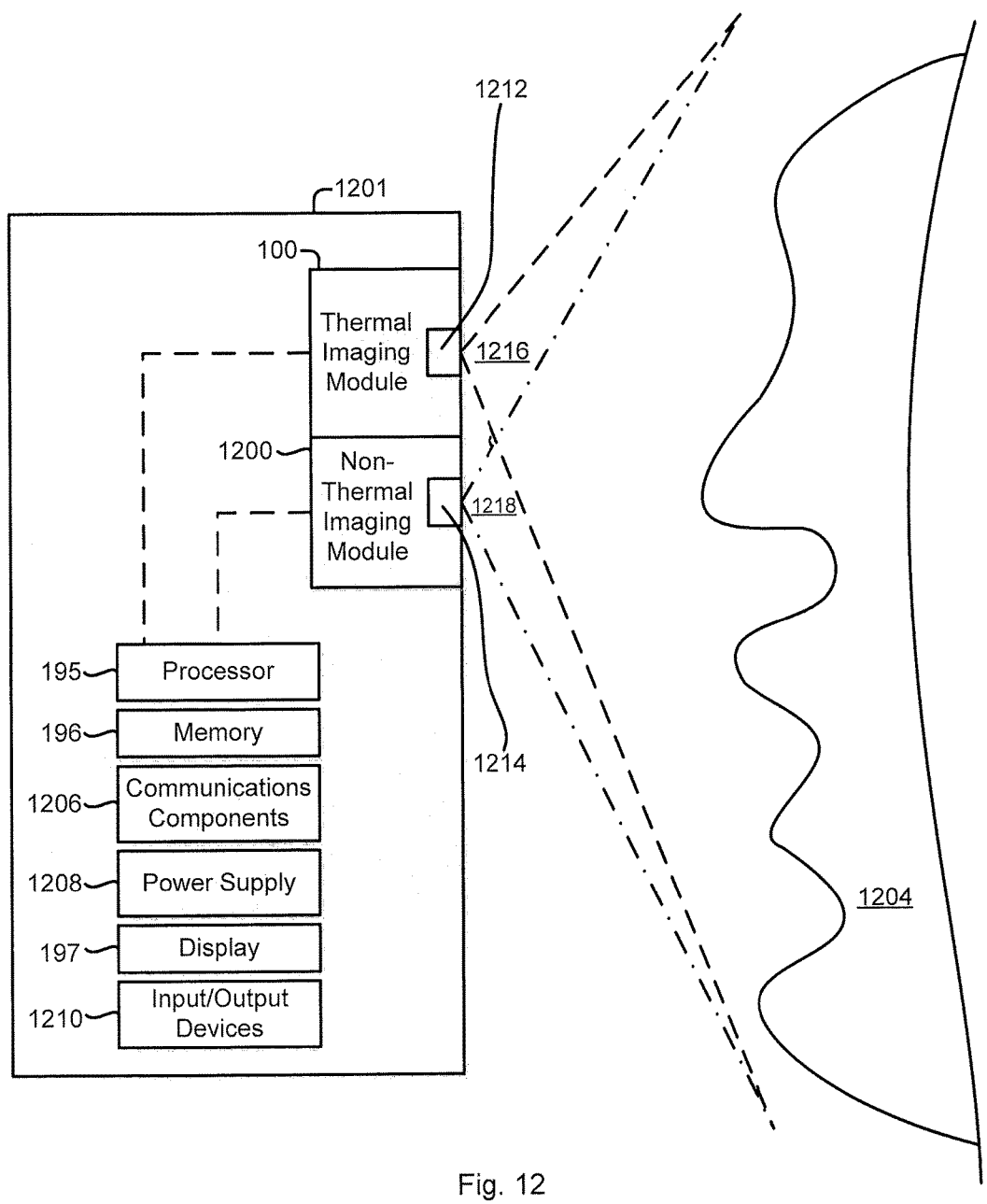
FIG. 12 illustrates a block diagram of a system having a thermal imaging module and a non-thermal imaging module in accordance with an embodiment of the disclosure.

Referring now to FIG. 12, a block diagram is shown of a system 1201. System 1201 may be an implementation of host device 102 of, for example, FIG. 1 or may represent a larger system incorporating elements of host device 102 or incorporating host device 102 entirely. For example, system 1201 may be an object recognition system (e.g., an authentication system) that recognizes objects based on thermal images captured by the system (e.g., based on a unique thermal profile of the object as determined using the thermal images). System 1201 may be a secure system such as an electronic device (e.g., a computing device such as a stationary or portable electronic device), a building, an airport, a secure area of an airport, prison, military base, or other secure area or location. In one embodiment, system 1201 may be a host device 102 implemented as a portable electronic device in which thermal images are used to control access to the device (e.g., in place of or in addition to a password or other authentication information). In another embodiment, system 1201 may be a distributed system in which one or more components (e.g., processor 195 and/or memory 196) are located remotely from imaging sensors such as thermal imaging module 100 and/or non-thermal imaging module 1200. For example, one or more thermal and/or non-thermal imaging modules may be located at each entrance such as a door of a location such as a building and communicatively coupled to remote processing equipment (e.g., at a security center at the building or remote from the building) for processing and recognition operations on image data from the imaging modules.

As shown in FIG. 12 system 1201 may include one or more non-thermal imaging modules such as non-thermal imaging modules 1200 (e.g., a visible light camera module configured to capture visible light images, a near infrared (NIR) imaging module configured to capture NIR images, or a visible light and NIR imaging module configured to capture combined and/or separate visible light and/or NIR images) in addition to one or more thermal imaging modules such as infrared imaging module 100 in accordance with an embodiment of the disclosure. In some embodiments, system 1201 may be used to image and/or identify objects such as object 1204 in a real-world scene. In the example of FIG. 12, object 1204 represents a human face to be recognized and/or identified using system 1201. However, this is merely illustrative. In general, system 1201 may recognize, identify, and/or authenticate any suitable object using thermal and/or non-thermal images captured using imaging modules 100 and 1200.

System 1201 may include one or more infrared imaging modules 100, one or more non-thermal imaging module 1200, and/or additional components as described above in connection with FIG. 1 (e.g., processor 195, memory 196, display 197, and/or other components such as communications components 1206, a power supply 1208 (e.g., a battery or a wired power supply), input/output components 1210 (e.g., a keyboard, a mouse, a touchscreen, a microphone, a speaker, etc.), a control panel, alert components, or other suitable device components). In various embodiments, components of system 1201 of FIG. 12 may be implemented in the same or similar manner as corresponding components of host device 102 of FIG. 1. Moreover, components of system 1201 may be configured to perform various NUC processes and other processes described herein.

As shown in FIG. 12, in some embodiments, thermal imaging module 100 may include various optical elements 1212 (e.g., one or more infrared-transmissive lens, one or more infrared-transmissive prisms, one or more infrared-reflective mirrors, or one or more infrared fiber optic elements) that guide infrared radiation from object 1204 to an FPA of thermal imaging module 100. In some embodiments, optical elements 1212 may be used to suitably define or alter the field of view (FOV) 1216 of thermal imaging module 100. A switchable FOV (e.g., selectable by infrared imaging module 100 and/or processor 195) may optionally be provided, which may be useful when, for example, a selective close-up view of a portion of object 1204 is desired.

Optical elements 1212 may also include one or more filters adapted to pass infrared radiation of some wavelengths but substantially block infrared radiation of other wavelengths (e.g., short-wave infrared (SWIR) filters, mid-wave infrared (MWIR) filters, long-wave infrared (LWIR) filters, and narrow-band filters). Such filters may be utilized to tailor infrared imaging module 100 for increased sensitivity to a desired band of infrared wavelengths. For example, in some situations, it may be desirable to detect exhaled breaths of a person or an animal. In this type of situation, a narrow-band filter that transmits only in the wavelengths matching a specific absorption/emission spectrum of carbon dioxide ($CO_2$) or other constituent gases of an exhaled breath may be used. In some embodiments, filters may be selectable (e.g., provided as a selectable filter wheel). In other embodiments, filters may be fixed as appropriate for a desired application of system 1201.

Non-thermal imaging module 1200 may be a small form factor non-thermal imaging module or imaging device, and may be implemented in a similar manner as various embodiments of infrared imaging module 100 disclosed herein, but with one or more sensors responsive to non-thermal radiation (e.g., radiation in the visible, near infrared, short-wave infrared or other non-thermal portion of the electromagnetic spectrum). For example, in some embodiments, non-thermal imaging module 1200 may be implemented with a charge-coupled device (CCD) sensor, an electron multiplying CCD (EMCCD) sensor, a complementary metal-oxide-semiconductor (CMOS) sensor, a scientific CMOS (sCMOS) sensor, an intensified charge-coupled device (ICCD), or other sensors.

As shown in FIG. 12, in some embodiments, non-thermal imaging module 1200 may include various optical elements 1214 (e.g., one or more lenses, one or more color filters, one or more prisms, one or more mirrors, or one or more fiber optic elements) that guide non-thermal radiation from object 1204 to non-thermal imaging module 1200. In some embodiments, optical elements 1214 may be used to suitably define or alter FOV 1218 of non-thermal imaging module 1200. A switchable FOV (e.g., selectable by non-thermal imaging module 1200 and/or processor 195) may optionally be provided, which may be useful when, for example, a selective close-up view of a portion of object 1204 is desired. If desired, elements 1212 and 1214 may be operable to alternately switch between an infrared imaging mode and a visible light imaging mode or other non-thermal imaging mode for system 1201.

Optical elements 1218 may also include one or more filters adapted to pass radiation of some wavelengths (colors) but substantially block radiation of other wavelengths (e.g., red color filters, blue color filters, green color filters, near-infrared color filters, short-wave infrared filters, and narrow-band filters). In some embodiments, filters of elements 1218 may be selectable (e.g., provided as a selectable filter wheel). In other embodiments, filters of element 1218 may be fixed as appropriate for a desired application of system 1201. Although non-thermal imaging modules 1200 is sometimes referred to herein as a visible light camera module as an example, it should be appreciated that camera module 1200 may be any suitable non-thermal camera module as described herein that generates images in response to incoming light having any suitable corresponding range of non-thermal wavelengths (e.g., visible light wavelengths, near infrared wavelengths, short-wave infrared wavelengths or other wavelengths that are relatively shorter than thermal infrared wavelengths).

In some embodiments, non-thermal images such as visible light images captured by non-thermal imaging module 1200 may be received by processor 195, which may fuse, superimpose, or otherwise combine the non-thermal images with the thermal images captured by infrared imaging module 100 as further described herein.

In some embodiments, non-thermal imaging module 1200 may be co-located with infrared imaging module 100 in a housing structure and oriented so that FOV 1218 at least partially overlaps FOV 1216 of infrared imaging module 100. In one example, infrared imaging module 100 and non-thermal imaging module 1200 may be implemented as a dual sensor module sharing a common substrate according to various techniques described in U.S. Provisional Patent Application No. 61/748,018 which is incorporated herein by reference in its entirety. Such a dual sensor module implementation may include common circuitry and/or common restraint devices for infrared imaging and visible light imaging, thereby potentially reducing an overall size of system 1201 as compared to embodiments where infrared imaging module 100 and non-thermal imaging module 1200 are implemented as individual modules. Additionally, the dual sensor module implementation may be adapted to reduce a parallax error between images captured by infrared imaging module 100 and non-thermal imaging module 1200 by reducing the distance between them.

Infrared images captured, processed, and/or otherwise managed by infrared imaging module 100 may be radiometrically normalized infrared images (e.g., thermal images). That is, pixels that make up the captured image may contain calibrated thermal data (e.g., temperature data). As discussed above in connection with FIG. 1, infrared imaging module 100 and/or associated components may be calibrated using appropriate techniques so that images captured by infrared imaging module 100 are properly calibrated thermal images. In some embodiments, appropriate calibration processes may be performed periodically by infrared imaging module 100 and/or processor 195 so that infrared imaging module 100, and hence the thermal images captured by it, may maintain proper calibration.

Radiometric normalization permits infrared imaging module 100 and/or processor 195 to efficiently detect, from thermal images, objects and/or portions or features of object having a specific range of temperature. Infrared imaging module 100 and/or processor 195 may detect such objects and/or a unique thermal signature or unique thermal profile of an object efficiently and effectively, because thermal images of objects having a specific temperature and/or a specific temperature profile may be easily discernible from a background and other objects, and yet less susceptible to lighting conditions, obscuring (e.g., obscured by clothing), or deception (e.g., an photograph or mask of an authorized user presented for image-based authentication).

Each person's face may have unique thermal features that are as particular to that person. Thermal and/or non-thermal images may be provided to processor 195. Processor 195 may perform object recognition operations using the thermal and/or the non-thermal images. In various embodiments, thermal and non-thermal images can be used together or separately to perform object recognition operations.

Figure 13:
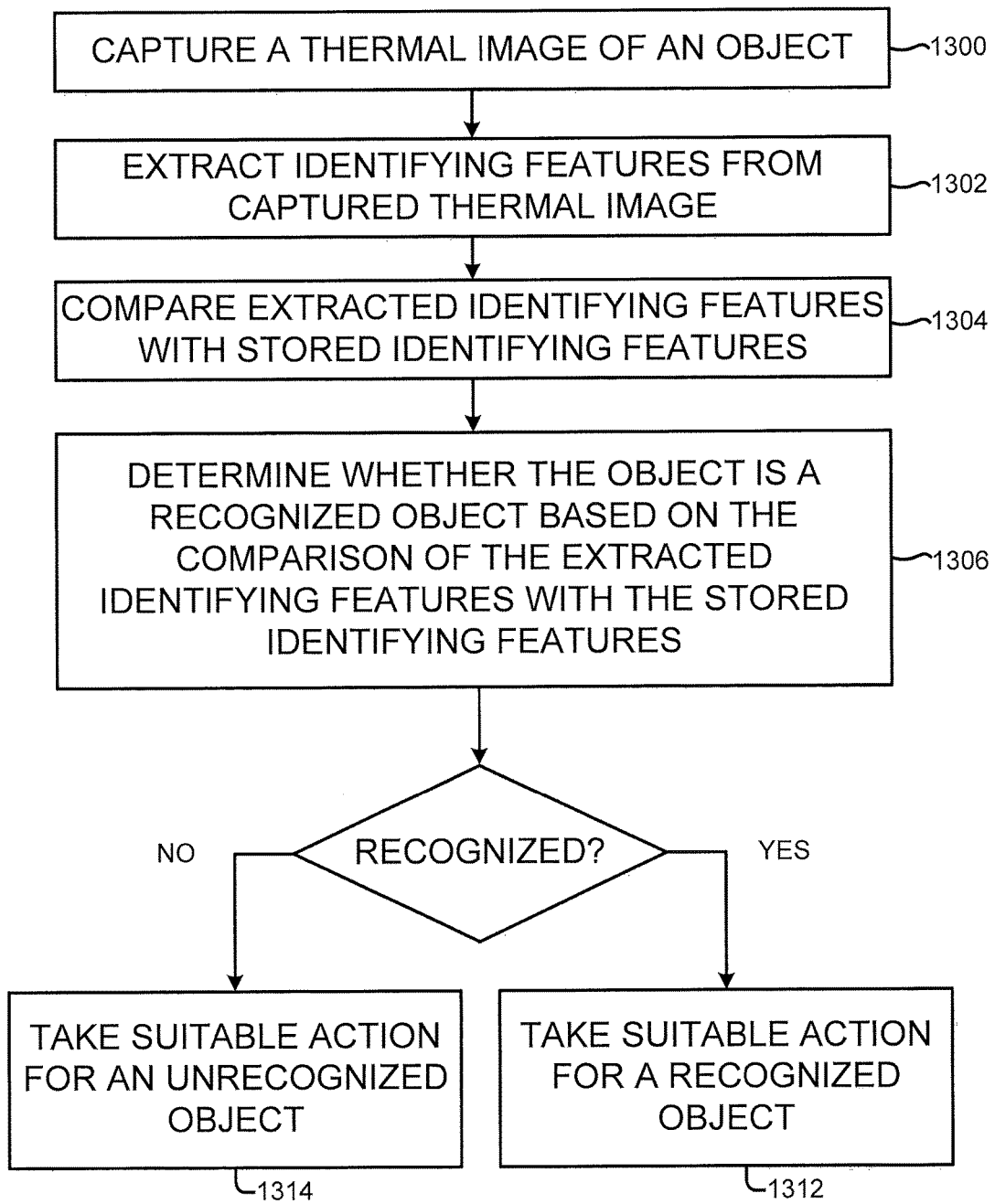
FIG. 13 illustrates a process for identifying objects using thermal images in accordance with an embodiment of the disclosure.
Figure 14:
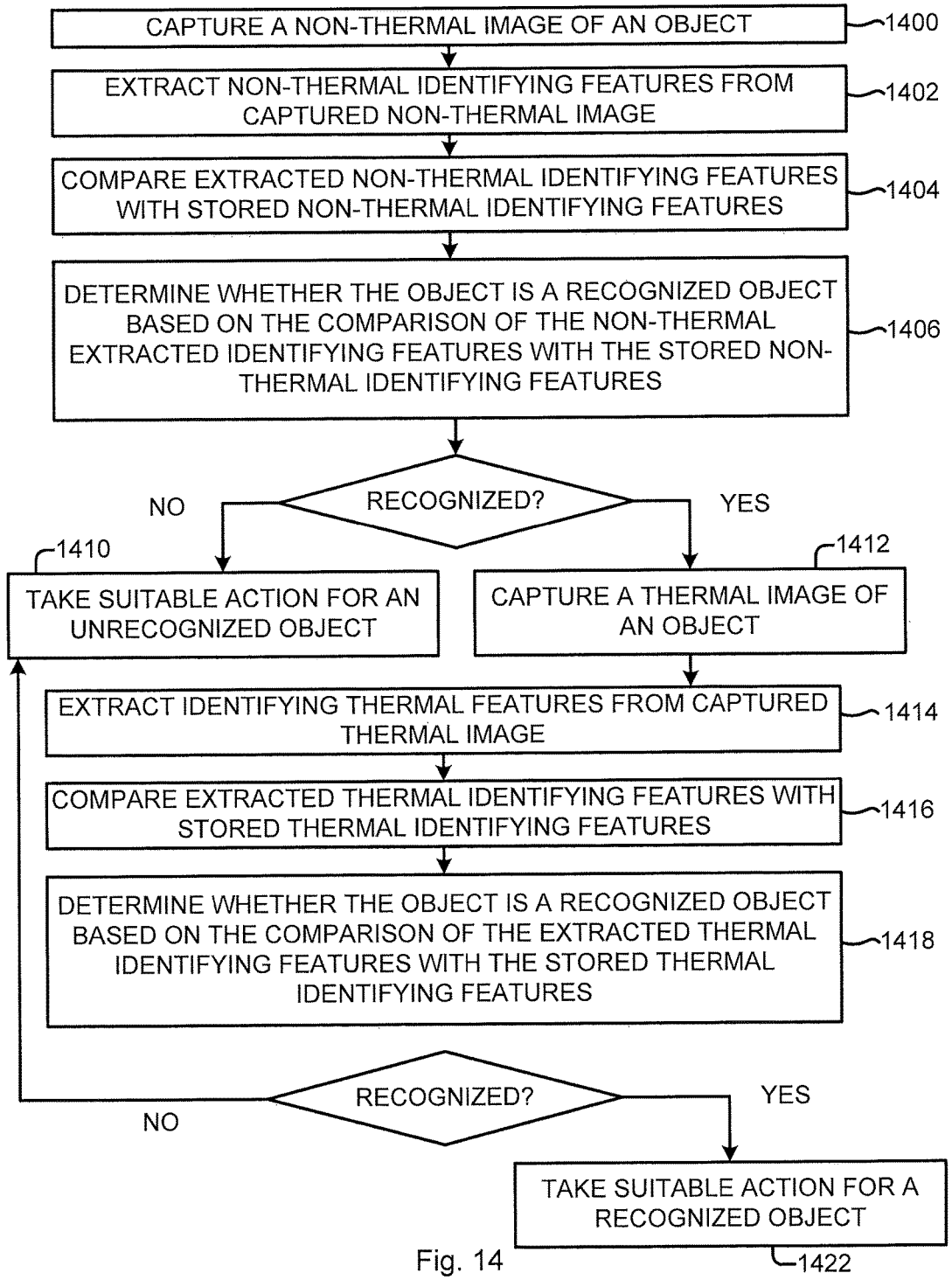
FIG. 14 illustrates a process for identifying objects using thermal images and non-thermal images in accordance with an embodiment of the disclosure.
Figure 15:
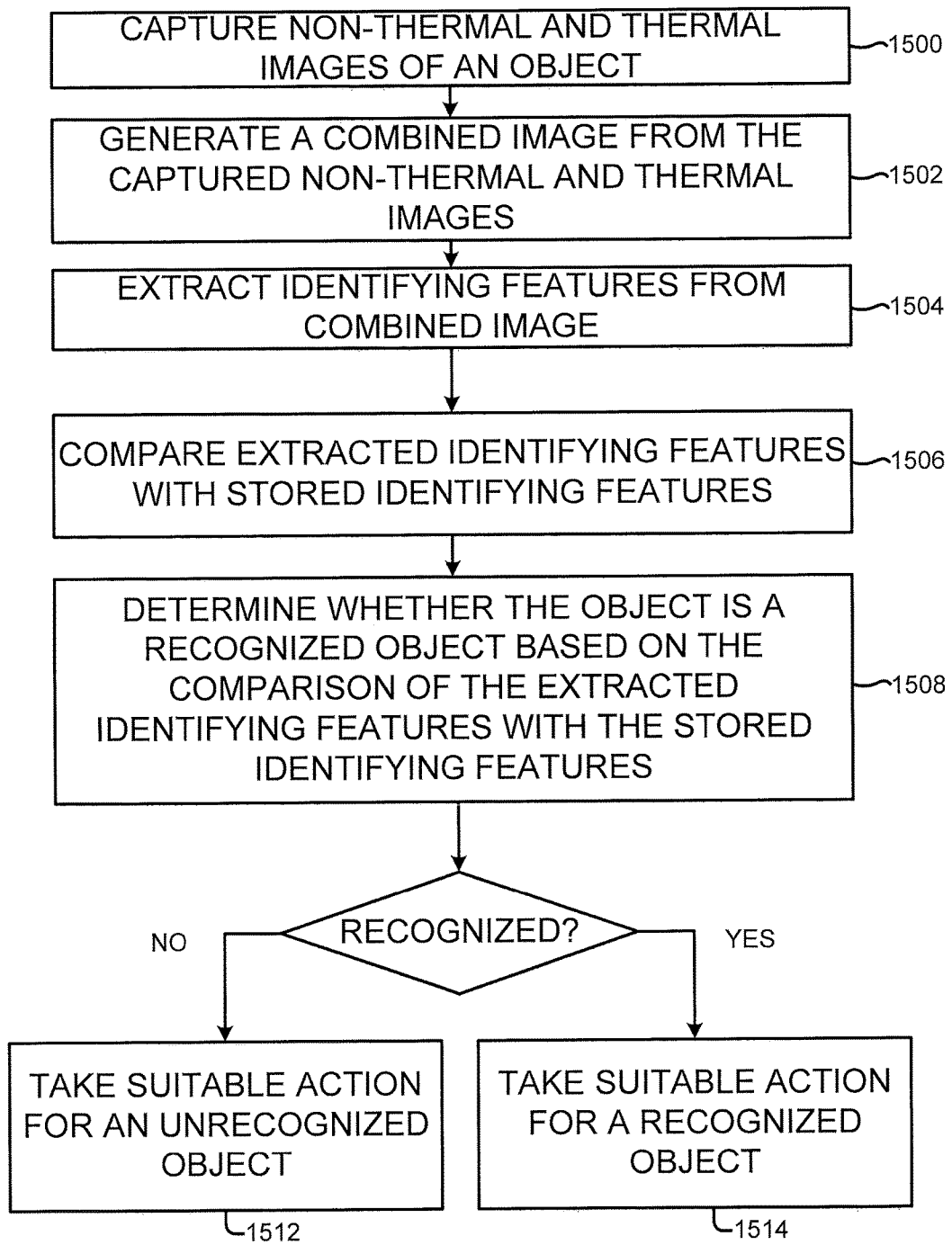
FIG. 15 illustrates a process for identifying objects using combined thermal and non-thermal images in accordance with an embodiment of the disclosure.

FIGS. 13, 14, and 15 are flowcharts of illustrative operations that may be performed by, for example, a system such as system 102 of FIG. 1 and/or system 1201 of FIG. 12 (as examples) for recognizing objects using thermal, non-thermal and thermal, and combined thermal and non-thermal images respectively.

As shown in FIG. 13, at block 1300, a thermal image of an object may be captured. The thermal image may be captured using, for example, a thermal imaging module such as infrared imaging module 100 as described herein.

At block 1302, identifying features of the object may be extracted from the captured thermal image. The identifying features may include a one, two, or three-dimensional thermal profile of the object corresponding to temperature levels and/or temperature variations at various locations on and/or around the object. For example, the object may be a human face, a portion of a face, or other portion of a person's body. The temperature variations on the person's face may be unique to that person and may be extracted from a thermal image of the person.

At block 1304, the extracted identifying features may be compared with stored identifying features of one or more objects. For example, the stored identifying features may be stored thermal profiles of authorized users of a secure system and/or thermal profiles of other animate and/or inanimate objects. The stored thermal profiles may be thermal profiles extracted from previously captured images of the object (e.g., when an authorized user account was set up for the person) or a similar object or may be computed and/or estimated identifying features of the object.

At block 1306, the system may determine whether the object is a recognized object based on the comparison of the extracted identifying features with the stored identifying features. For example, the system may determine that the extracted identifying features match the stored identifying features of a particular authorized user of a secure system and thereby recognize the object as the authorized user. In another example, the system may determine that the extracted identifying features match the stored identifying features of a particular type of plant or animal and thereby recognize that the object is the plant or animal.

In response to determining that the object is a recognized object, at block 1312, the system may take suitable action for a recognized object. Suitable action for a recognized object may include, as examples, authenticating an authorized user and providing access to a secure system, adding the recognized object to a database of recognized objects and/or alerting security personnel that the object is recognized.

In response to determining that the object is not a recognized object, at block 1314, the system may take suitable action for an unrecognized object. Suitable action for an unrecognized object may include, as examples, prompting a user that is attempting to authenticate to restart authentication operations and/or to provide additional or different authentication information, notifying an operator that the object is not recognized and/or alerting security personnel of an unauthorized user and/or unauthorized authentication attempt.

In one embodiment, recognition operations may be performed using non-thermal images prior to and/or after performing additional recognition operations using associated thermal images. In this way thermal image authentication operations can be provided as a backup and/or verification operation in addition to a visible light object recognition system.

As shown in the embodiment of FIG. 14, at block 1400, a non-thermal image such as a visible light and/or near infrared image of an object may be captured. The non-thermal image may be captured using, for example, a non-thermal imaging module such as non-thermal imaging module 1200 as described herein (see FIG. 12).

At block 1402, non-thermal identifying features of the object may be extracted from the captured non-thermal image. The non-thermal identifying features may include a one, two, or three-dimensional visual profile of the object, the color and/or color variations of the object, sub-features of the object (e.g., uniquely identifying features such as the shape, color, and/or other features of a person's eye, or a fingerprint) and/or other visually distinguishable features of the object.

At block 1404, the extracted non-thermal identifying features may be compared with stored non-thermal identifying features of one or more objects. For example, the stored non-thermal identifying features may be stored pictures or other visual profiles of authorized users of a secure system (e.g., images of a face, a fingerprint, eye, or other identifiably unique features) and/or images of other animate and/or inanimate objects. The stored non-thermal identifying features may be previously captured non-thermal images of the object and/or previously extracted identifying features from previously captured non-thermal images of the object (e.g., captured when an authorized user account was set up for the person) or a similar object or may be computed and/or estimated non-thermal identifying features of the object.

At block 1406, the system may determine whether the object is a recognized object based on the comparison of the extracted non-thermal identifying features with the stored non-thermal identifying features. For example, the system may determine that a captured visible light image matches the stored visible light image of a particular authorized user of a secure system and thereby recognize the object as the authorized user. In another example, the system may determine that extracted features from the captured visible light image matches the stored extracted features of a particular authorized user of a secure system and thereby recognize the object as the authorized user. In another example, the system may determine that the extracted non-thermal identifying features match the stored non-thermal identifying features of a particular type of plant or animal and thereby recognize the object is the plant or animal.

In response to determining that the object is not a recognized object, at block 1410, the system may take suitable action for an unrecognized object. Suitable action for an unrecognized object may include, as examples, prompting a user that is attempting to authenticate to restart authentication operations and/or to provide additional or different authentication information, notifying an operator that the object is not recognized and/or alerting security personnel of an unauthorized user and/or unauthorized authentication attempt.

In response to determining that the object is a recognized object, at block 1412, in order to verify that the object is the recognized object (e.g., to verify that the recognized object is not a copy, an image, or a replica of the recognized object and/or to verify that the recognized object is an animate object such as a living person) the system may capture a thermal image of the object. The thermal image may be captured using, for example, a thermal imaging module such as infrared imaging module 100 as described herein.

At block 1414, identifying thermal features of the object may be extracted from the captured thermal image. The identifying thermal features may include features as described above, for example, in connection with block 1302 of FIG. 13.

At block 1416, the extracted thermal identifying features may be compared with stored thermal identifying features of one or more objects. For example, the stored identifying features may include stored features as described above, for example, in connection with block 1304 of FIG. 13.

At block 1418, the system may determine whether the object is a recognized object based on the comparison of the extracted thermal identifying features with the stored thermal identifying features. For example, the system may determine that the extracted thermal identifying features match the stored thermal identifying features of the recognized object of block 1406 and thereby verify that the object is the recognized object. In this way, a second, orthogonal identification of the object may be performed to supplement the visual identification of the object. In another example, the system may determine that one or more temperatures and/or temperature profiles in the extracted thermal identifying features correspond to the temperature profile of an animate object such as a human. In this way, the system may verify that the authorized user recognized at block 1406 is the human user and not a picture of the user or a mask of the user.

In response to determining that the object is a recognized object, at block 1422, the system may take suitable action for a recognized object. Suitable action for a recognized object may include, as examples, authenticating an authorized user and providing access to a secure system, adding the recognized object to a database of recognized objects and/or alerting security personnel that the object is recognized.

In response to determining that the object is not a recognized object, the system may proceed to block 1410 and take suitable action for an unrecognized object.

In one embodiment, recognition operations may be performed using combined images formed form a combination and/or fusion of non-thermal and thermal images. As shown in FIG. 15, at block 1500, a non-thermal image such as a visible light and/or near infrared image of an object and a thermal image of the object may be captured. The non-thermal and thermal images may be respectively captured, for example, by a non-thermal imaging module 1200 and an infrared imaging module 100 of system 1201 of FIG. 12.

At block 1502, image data corresponding to thermal and non-thermal images may be combined to form an output image such as a combined image. Combining the image data may include overlaying image data, fusing the image data or otherwise combining the image data according to various embodiments.

One or both of the thermal and non-thermal images may be processed prior to combining the image data. For example, various corrections may be made to one or more captured thermal images using techniques described herein and/or techniques disclosed in U.S. Provisional Patent Application No. 61/545,056 filed Oct. 7, 2011 and entitled "NON-UNIFORMITY CORRECTION TECHNIQUES FOR INFRARED IMAGING DEVICES" which is hereby incorporated by reference in its entirety Fusing the image data may include combining a first image (e.g., a thermal IR image) with the high spatial frequency content of a second image (e.g., a visual and/or NIR image) to yield a combined image. The combination can be performed through superimposition of the high spatial frequency content of the second image and the first image, or alternatively superimposing the first image on the high spatial frequency content of the second image. As a result, contrasts from the second image can be inserted into the first image, thereby combining the advantages of the two image types without losing clarity and interpretability of the resulting combined image.

Both images may originally have substantially the same resolution, or the resolution of the images may differ. Since the resolution of thermal image can be lower than that of a visual or NIR image, due to properties of thermal imaging devices compared to visual and NIR imaging devices, the resolution of the first image may be up-sampled to be substantially the same as the resolution of the visual image or the second image can be down-sampled to be substantially the same as the resolution of the first image, as examples. In a further example, both images can be resampled to fit a third resolution, if suitable. In one example, the third resolution can be that of a display screen where the combined image is to be displayed.

Additionally, extraction of high spatial frequency content in the non-thermal image and de-noising and/or blurring of the thermal image, or a portion of the thermal image, may be performed. These operations may be achieved by high pass filtering the second image and low pass filtering the first image, or a portion of the first image, by use of spatial filters that are moved across the images, pixel by pixel. It is evident to a person skilled in the art that other well-known image processing methods may be used to render the same result. As a result of the filtering performed on the first image, or the portion of the first image, the first image, or the portion of the first image, can be rendered smooth and/or contain a reduced amount of noise compared to the original first image. Additionally, the high spatial frequency content extracted from the second image contains information on large contrasts in the second image, i.e. information on where sharp edges such as object contours are located in the second image. The operations of performing filtering of the first image are optional.

Besides high pass filtering, examples of methods for extracting high spatial frequency content in an image may include extracting the difference (commonly referred to as a difference image) between two images depicting the same scene, where a first image frame is captured at one time instance and a second image frame is captured at a second time instance, preferably close in time to the first time instance. The two image frames may typically be two consecutive image frames in an image frame sequence. High spatial frequency content, representing edges and contours of the objects in the scene, may appear in the difference image. Additional details of image fusion processes can be found below in connection with FIG. 16 and/or in U.S. Patent Publication No. 2014/0015982 filed Apr. 2, 2012 which is incorporated herein by reference in its entirety and/or in U.S. patent application Ser. No. 14/138,058 which is incorporated herein by reference in its entirety.

At block 1504, identifying features of the object may be extracted from the combined image. The identifying features may include both visually and thermally recognizable features such as a one, two, or three-dimensional thermal profile of the object corresponding to temperature levels and/or temperature variations at various locations on and/or around the object and/or edge features of visually detectable portions of the object. For example, the object may be a human face, a portion of a face, or other portion of a person's body. The edge features may be used to help determine that a particular portion of a thermal image having a corresponding temperature corresponds to an eye, nose, mouth, or other facial feature of the user.

At block 1506, the extracted identifying features may be compared with stored identifying features of one or more objects. For example, once a temperature from a portion of a thermal image is identified as corresponding to a particular facial feature of a user, the corresponding temperature of that feature may be compared with a stored temperature of that feature of that user. Stored identifying features may include a stored combined thermal and non-thermal image, extracted identifying thermal and non-thermal identifying features from previously generated combined thermal and non-thermal images of an object (e.g., generated and/or extracted when an authorized user account was set up for the user) or a similar object, and/or may be computed and/or estimated identifying features of the object.

At block 1508, the system may determine whether the object is a recognized object based on the comparison of the extracted non-thermal and thermal identifying features with the stored non-thermal and thermal identifying features. For example, the system may determine that the extracted non-thermal and thermal identifying features match the stored non-thermal and thermal identifying features of a particular authorized user of a secure system and thereby recognize the object as the authorized user. In another example, the system may determine that the extracted non-thermal and thermal identifying features match the stored non-thermal and thermal identifying features of a particular type of plant or animal and thereby recognize the object is the plant or animal.

In response to determining that the object is a recognized object, at block 1514, the system may take suitable action for a recognized object. Suitable action for a recognized object may include, as examples, authenticating an authorized user and providing access to a secure system, adding the recognized object to a database of recognized objects and/or alerting security personnel that the object is recognized.

In response to determining that the object is not a recognized object, at block 1512, the system may take suitable action for an unrecognized object. Suitable action for an unrecognized object may include, as examples, prompting a user that is attempting to authenticate to restart authentication operations and/or to provide additional or different authentication information, notifying an operator that the object is not recognized and/or alerting security personnel of an unauthorized user and/or unauthorized authentication attempt.

Figure 16:
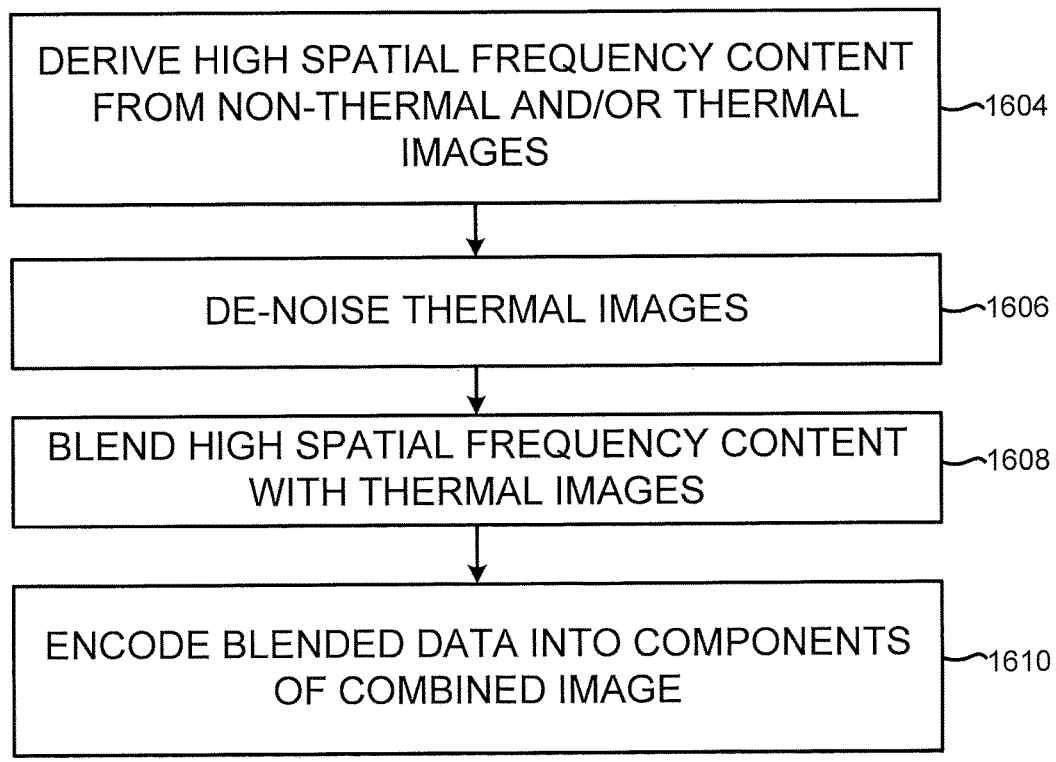
FIG. 16 illustrates a process for combining thermal images and non-thermal images in accordance with an embodiment of the disclosure.

FIG. 16 is a flowchart of illustrative operations that may be used for generating a combined image from captured non-thermal and thermal images at, for example, block 1502 of FIG. 15. The combined images may include radiometric data and/or other infrared characteristics corresponding to an object such as object 1204 of FIG. 12, but with significantly more object detail (e.g., contour or edge detail) and/or contrast than typically provided by the thermal or visible light images alone. Thus, for example, the combined images generated in these examples may beneficially provide sufficient radiometric data, detail, and contrast to allow easier recognition and/or interpretation of the presence, location, position, or other features of an objects such as a human face, another portion of a person, humans, animals or other objects.

At block 1604, high spatial frequency content from one or more of the non-thermal and thermal images captured at, for example, block 1500 of FIG. 15, may be derived from one or more of the non-thermal and thermal images. High spatial frequency content derived according to various embodiments may include edge/contour details and/or high contrast pixels extracted from the one or more of the visible light and thermal images, for example.

In one embodiment, high spatial frequency content may be derived from the received images by performing a high pass filter (e.g., a spatial filter) operation on the images, where the result of the high pass filter operation is the high spatial frequency content. In an alternative embodiment, high spatial frequency content may be derived from the received images by performing a low pass filter operation on the images, and then subtracting the result from the original images to get the remaining content, which is the high spatial frequency content. In another embodiment, high spatial frequency content may be derived from a selection of images through difference imaging, for example, where one image is subtracted from a second image that is perturbed from the first image in some fashion, and the result of the subtraction is the high spatial frequency content. For example, optical elements 1212 of infrared imaging module 100 and/or optical elements 1214 of non-thermal imaging module 1200 may be configured to introduce vibration, de-focusing, and/or movement artifacts into a series of images captured by one or both of infrared imaging module 100 and non-thermal imaging module 1200. High spatial frequency content may be derived from subtractions of images such as adjacent images in the series.

In some embodiments, high spatial frequency content may be derived from only the non-thermal images or the thermal images. In other embodiments, high spatial frequency content may be derived from only a single non-thermal or thermal image. In further embodiments, high spatial frequency content may be derived from one or more components of the non-thermal and/or thermal mages, such as a luminance component of visible light images, for example, or a radiometric component of thermal images. Resulting high spatial frequency content may be stored temporarily (e.g., in memory 196) and/or may be further processed.

At block 1606, one or more thermal images may be de-noised. For example, processor 195 may be configured to de-noise, smooth, or blur one or more thermal images of object 1204 using a variety of image processing operations. In one embodiment, removing high spatial frequency noise from the thermal images allows the processed thermal images to be combined with high spatial frequency content derived according to block 1604 with significantly less risk of introducing double edges (e.g., edge noise) to objects depicted in combined images of object 1204.

In one embodiment, removing noise from the thermal mages may include performing a low pass filter (e.g., a spatial and/or temporal filter) operation on the images, where the result of the low pass filter operation is de-noised or processed thermal images. In a further embodiment, removing noise from one or more thermal images may include down-sampling the thermal images and then up-sampling the images back to the original resolution.

In another embodiment, processed thermal images may be derived by actively blurring thermal images of object 1204. For example, optical elements 1212 may be configured to slightly de-focus one or more thermal images captured by infrared imaging module 100. The resulting intentionally blurred thermal images may be sufficiently de-noised or blurred so as to reduce or eliminate a risk of introducing double edges into combined images of object 1204, as further described below. In other embodiments, blurring or smoothing image processing operations may be performed by processor 195 on the received thermal images as an alternative or supplement to using optical elements 1212 to actively blur thermal images of object 1204. Resulting processed thermal images may be stored temporarily (e.g., in memory 196) and/or may be further processed according to block 1608.

At block 1608, high spatial frequency content may be blended with one or more thermal images. For example, processor 195 may be configured to blend high spatial frequency content derived in block 1604 with one or more thermal images of object 1204, such as the processed thermal images provided in block 1606.

In one embodiment, high spatial frequency content may be blended with thermal images by superimposing the high spatial frequency content onto the thermal images, where the high spatial frequency content replaces or overwrites those portions of the thermal images corresponding to where the high spatial frequency content exists. For example, the high spatial frequency content may include edges of portions of object 1204 depicted in images of object 1204, but may not exist within the interior of such portion. In such embodiments, blended image data may simply include the high spatial frequency content, which may subsequently be encoded into one or more components of combined images, as described in block 1610.

For example, a radiometric component of thermal images may be a chrominance component of the thermal images, and the high spatial frequency content may be derived from the luminance and/or chrominance components of visible light images. In this embodiment, combined images may include the radiometric component (e.g., the chrominance component of the thermal images) encoded into a chrominance component of the combined images and the high spatial frequency content directly encoded (e.g., as blended image data but with no thermal image contribution) into a luminance component of the combined images. By doing so, a radiometric calibration of the radiometric component of the thermal images may be retained. In similar embodiments, blended image data may include the high spatial frequency content added to a luminance component of the thermal images, and the resulting blended data encoded into a luminance component of resulting combined images.

In other embodiments, high spatial frequency content may be derived from one or more particular components of one or a series of visible light and/or thermal images, and the high spatial frequency content may be encoded into corresponding one or more components of combined images. For example, the high spatial frequency content may be derived from a luminance component of visible spectrum images, and the high spatial frequency content, which in this embodiment is all luminance image data, may be encoded into a luminance component of combined images.

In another embodiment, high spatial frequency content may be blended with thermal images using a blending parameter and an arithmetic equation. For example, in one embodiment, the high spatial frequency content may be derived from a luminance component of visible light images. In such an embodiment, the high spatial frequency content may be blended with a corresponding luminance component of thermal image according to a blending parameter and a blending equation to produce blended image data. The blended image data may be encoded into a luminance component of combined images, for example, and the chrominance component of the thermal images may be encoded into the chrominance component of the combined images. In embodiments where the radiometric component of the infrared images may be their chrominance component, the combined images may retain a radiometric calibration of the thermal images. In other embodiments, portions of the radiometric component may be blended with the high spatial frequency content and then encoded into combined images.

More generally, the high spatial frequency content may be derived from one or more components of visible light images and/or thermal image. In such an embodiment, the high spatial frequency content may be blended with one or more components of the thermal images to produce blended image data (e.g., using a blending parameter and a blending equation), and resulting combined images may include the blended image data encoded into corresponding one or more components of the combined images. In some embodiments, the one or more components of the blended data do not have to correspond to the eventual one or more components of the combined images (e.g., a color space/format conversion may be performed as part of an encoding process).

A blending parameter value may be selected by an operator or other user or may be automatically determined by processor 195 according to context or other data, for example, or according to an image enhancement level expected by system 1201. In some embodiments, the blending parameter may be adjusted or refined while combined images are being displayed (e.g., by display 197). In some embodiments, a blending parameter may be selected such that blended image data includes only thermal characteristics, or, alternatively, only visible light characteristics. A blending parameter may also be limited in range, for example, so as not to produce blended data that is out-of-bounds with respect to a dynamic range of a particular color space/format or a display.

In addition to or as an alternative to the processing described above, processing according to the high contrast mode may include one or more processing steps, ordering of processing steps, arithmetic combinations, and/or adjustments to blending parameters as disclosed in U.S. patent application Ser. No. 13/437,645 which is incorporated herein by reference in its entirety. For example, the following equations may be used to determine the components Y, Cr and Cb for the combined images with the Y component from the high pass filtered visible light images and the Cr and Cb components from the thermal images.

$$hp\_y\_vis = \text{highpass}(y\_vis)$$

$$(y\_ir, cr\_ir, cb\_ir) = \text{colored}(\text{lowpass}(ir\_signal\_linear))$$

In the above equations, highpass(y_vis) may be high spatial frequency content derived from high pass filtering a luminance component of visible light images. Colored(lowpass(ir_signal_linear)) may be the resulting luminance and chrominance components of the thermal images after the thermal images are low pass filtered. In some embodiments, the thermal images may include a luminance component that is selected to be 0.5 times a maximum luminance (e.g., of a display and/or a processing step). In related embodiments, the radiometric component of the thermal images may be the chrominance component of the thermal images. In some embodiments, the y_ir component of the thermal images may be dropped and the components of the combined images may be (hp_y_vis, cr_ir, cb_ir), using the notation above.

In another embodiment, the following equations may be used to determine the components Y, Cr and Cb for combined images with the Y component from the high pass filtered visible light images and the Cr and Cb components from the thermal images.

$$comb\_y = y\_ir + \text{alpha} \times hp\_y\_vis$$

$$comb\_cr = cr\_ir$$

$$comb\_cb = cb\_ir$$

The variation of alpha thus gives the user an opportunity to decide how much contrast is needed in the combined images. With an alpha of close to zero, the thermal images alone will be shown, but with a very high alpha, very sharp contours/edges can be seen in the combined images. Theoretically, alpha can be an infinitely large number, but in practice a limitation will probably be necessary, to limit the size of alpha that can be chosen to what will be convenient in the current application.

Once the high spatial frequency content is blended with one or more thermal images, processing may proceed to block 1610, where blended data may be encoded into components of the combined images in order to form the combined images.

At block 1610, the blended data may be encoded into one or more components of the combined images. For example, processor 195 may be configured to encode blended data derived or produced in accordance with block 1608 into combined images that increases, refines, or otherwise enhances the information conveyed by either the visible light or thermal images viewed by themselves. In some embodiments, encoding blended image data into a component of combined images may include additional image processing operations, for example, such as dynamic range adjustment, normalization, gain and offset operations, noise reduction, and color space conversions, for instance.

In addition, processor 195 may be configured to encode other image data into combined images. For example, if blended image data is encoded into a luminance component of combined images, a chrominance component of either visible light images or thermal images may be encoded into a chrominance component of combined images. Selection of source images may be made through user input, for example, or may be determined automatically based on context or other data. More generally, in some embodiments, a component of combined images that is not encoded with blended data may be encoded with a corresponding component of visible light images or thermal images. By doing so, a radiometric calibration of thermal images and/or a color space calibration of visible light images may be retained in the resulting combined images.

In some embodiments, at least some part or some functionalities of processor 195 described herein may be implemented as part of infrared imaging modules 100, for example, at processing module 160 described above in connection with FIG. 3. In some embodiments, at least some part or some functionalities of processor 195 may be part of or implemented with other existing processors of an external device such as a mobile phone, a tablet device, a laptop computer, a desktop computer, an automobile information display system, or any other devices that may be used to present monitoring information from a monitoring system. In other embodiments, processor 195 may interface and communicate with such other external processors and components associated with such processors.

Object recognition operations as described herein may be used to perform various authentication operations for potential users of various secure systems. Secure systems may include computing systems such as phones, tablets, computers, automatic teller machines, or other computing systems or larger restricted access systems such as secure buildings and/or facilities (e.g., airports, prisons, etc.). Object recognition operations as described herein may be used to replace and/or supplement password entry operations and/or to positively identify an individual as they approach a gate or other access point and automatically allow entry without the individual having to stop to "check in." Object recognition operations using thermal imaging may facilitate recognition and/or authentication in low light, obscured, and/or total darkness conditions.

Figure 17:
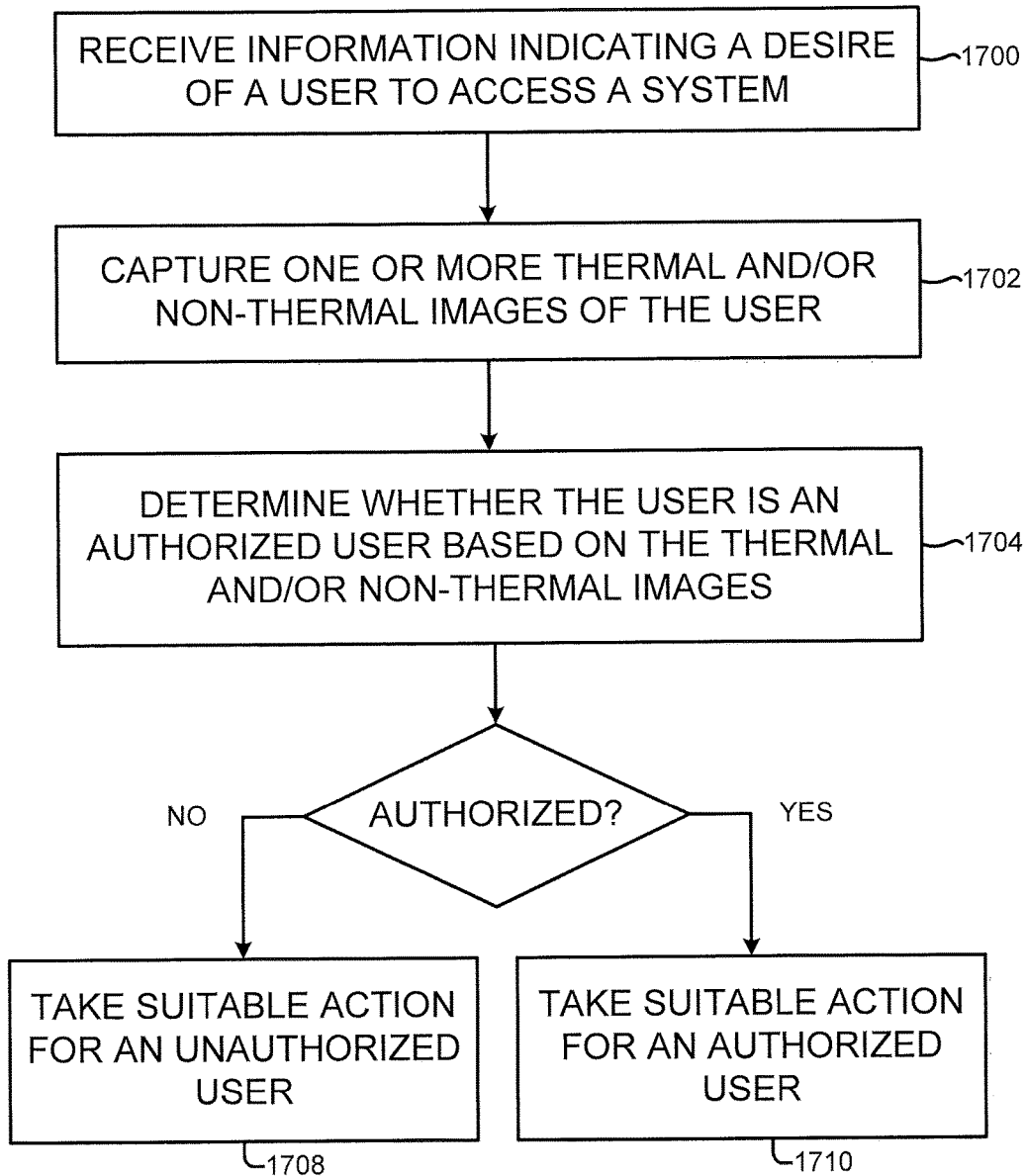
FIG. 17 illustrates a process for authenticating users of a secure system using thermal images in accordance with an embodiment of the disclosure.

FIG. 17 is a flowchart of illustrative operations that may be used for authentication using thermal images (e.g., using object recognition operations using thermal signatures). At block 1700 a system such as system 1201 of FIG. 12 may receive information indicating a desire of a user to access a secure system. The system may form an integral portion of the secure system or may be separate system communicatively coupled to the secure system. For example, in one embodiment, the secure system may be an electronic device such as a computing device that requires authentication to access and/or use the device. For example, the secure system may be a user's mobile phone that is locked. In these embodiments, the system may include an integrated thermal imaging module and/or an integrated non-thermal imaging module coupled to a processor of the system that is configured to perform image processing and/or authentication operations and, if desired, other operations for the device. In other embodiments, the secure system may be a larger system such as a building, an airport, a secure area of an airport, a prison, a portion of a prison, or any other suitable secure system. In these embodiments, the system may be an imaging authentication system that provides authentication information to the secure system. For example, an imaging device including one or more thermal and/or non-thermal imaging modules may be mounted at an entrance to the secure system and may provide image data and/or authorization information to a processor of the system, a remote processor, and/or an operator of the secure system. The authorization information may indicate whether a potential user is authorized to access the secure system. A system processor may be collocated with one or more of the imaging modules or may be located separately from one or more of the imaging modules.

In some embodiments, receiving the information indicating the desire of the user to access the secure system may include receiving input from the user through an input-output component such as a touchscreen display, a mouse, a keyboard, a button or other component such as a motion sensing component of an electronic device. In other embodiments, receiving the information indicating the desire of the user to access the system may include determining that the user is approaching the system. For example, when a person approaches the security checkpoint at an airport, at a prison, on a military base, or elsewhere, imaging sensors and/or motion sensors may detect the approaching person.

At block 1702, one or more thermal and/or non-thermal images of the user may be captured as, for example, described herein. The thermal and/or non-thermal images may be captured in response to the receipt of the information indicating the desire of the user to access the secure system.

At block 1704, the system may determine whether the user is an authorized user based on the thermal and/or non-thermal images. Determining whether the user is an authorized user based on the thermal and/or non-thermal images may include recognizing the user based on the thermal images, the thermal and the non-thermal images, and/or a combined image generated from the thermal and non-thermal images as described above in connection with FIGS. 13, 14, 15, and/or 16 and, responsive to recognizing the user, determining whether the user is authorized to access the secure system (e.g., by checking the security credentials and/or clearance of the recognized user by accessing a database).

In response to determining that the user is an authorized user, at block 1710, the system may take suitable action for an authorized user. Suitable action for an authorized user may include, as examples, authenticating the authorized user and providing access for the user to the secure system (e.g., logging the user into a computing device or allowing the user to pass a security checkpoint), and/or alerting security personnel that the user is authorized.

In response to determining that the user is an unauthorized user, at block 1708, the system may take suitable action for an unauthorized user. Suitable action for an unauthorized user may include, as examples, prompting the user to restart authentication operations and/or to provide additional or different authentication information, blocking access for the user to the secure system, notifying an operator that the user is not authorized and/or alerting security personnel of an unauthorized user and/or unauthorized authentication attempt.

The systems and methods described herein may provide the advantage over conventional systems reducing errors in recognizing objects and/or authenticating users of various secure systems by utilizing the unique thermal characteristics of the objects and/or the users.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into substeps to provide features described herein.

Embodiments described above illustrate but do not limit the invention. It should also be understood that numerous modifications and variations are possible in accordance with the principles of the invention. Accordingly, the scope of the invention is defined only by the following claims.

What is claimed is:

1. An authentication system comprising:
an imaging device configured to capture a thermal image of a user and a non-thermal image of the user; and
a processor in communication with the imaging device, wherein the processor is configured to:
derive, based on the captured thermal image of the user, a thermal profile indicating temperature variations within an area of the captured thermal image corresponding to at least a portion of the user;
recognize the user based on the captured thermal image and the captured non-thermal image, wherein the recognize the user comprises comparing the derived thermal profile against a stored thermal profile associated with the user; and in response to determining that the user is recognized as an authorized user, authenticate the user by providing the user access to a secure system and/or alerting security personnel that the user is recognized as an authorized user.

2. The authentication system of claim 1, wherein the secure system comprises at least one of a computing device, a building, or a secure area of a location.

3. The authentication system of claim 1, wherein the processor is further configured to combine the thermal image and the non-thermal image by:
   extracting high contrast features of the user from the non-thermal image; and
   combining the high contrast features with the thermal image.

4. The authentication system of claim 1, wherein the derived thermal profile is a three-dimensional thermal profile of the user.

5. A system comprising:
   a thermal imaging module configured to capture a thermal image of a user;
   a non-thermal imaging module configured to capture a non-thermal image of the user; and
   a processor in communication with the thermal imaging module and the non-thermal imaging module, wherein the processor is configured to:
      combine the thermal image and the non-thermal image into a combined image;
      derive, based on the combined image, a thermal profile indicating temperature variations within an area of the combined image corresponding to at least a portion of the user;
      determine whether the user corresponds to an authorized user based on the combined image, wherein the determine comprises comparing the derived thermal profile against a stored thermal profile associated with an authorized user; and
      in response to determining that the user corresponds to an authorized user, authenticate the user by providing the user access to a secure system and/or alerting security personnel that the user is determined to be an authorized user.

6. The system of claim 5, wherein the processor is further configured to determine that the user corresponds to an authorized user by first recognizing the user in the non-thermal image and then verifying that the user is a living user based on the thermal image.

7. The system of claim 5, wherein the combine the thermal image and the non-thermal image comprises:
   extracting high contrast features of the user from the non-thermal image; and
   combining the high contrast features with the thermal image.

8. A portable electronic device comprising the system of claim 5.

9. A method, comprising:
   capturing a thermal image of an object;
   capturing a non-thermal image of the object;
   deriving, based on the captured thermal image of the object, a thermal profile indicating temperature variations within an area of the captured thermal image corresponding to at least a portion of the object;
   recognizing the object based on the thermal image and the non-thermal image, wherein the recognizing the object comprises comparing the derived thermal profile against a stored thermal profile associated with the object;
   in response to determining that the object is recognized as an authorized object, authenticating a person by providing the person access to a secure system or alerting security personnel that the object is recognized as an authorized object, or both.

10. The method of claim 9, wherein the recognizing the object further comprises:
    extracting identifying features of the object from the thermal image; and
    comparing the extracted identifying features with stored identifying features of a plurality of objects.

11. The method of claim 9, further comprising receiving information indicating that the person desires to access the secure system and wherein the capturing the thermal image is responsive to the receiving of the information.

12. The method of claim 9, wherein the secure system comprises an electronic device.

13. The method of claim 10, wherein the extracted identifying features comprise the derived thermal profile.

14. The method of claim 9, further comprising:
    recognizing the object based on the non-thermal image; and
    verifying that the object is an animate object based on the thermal image.

15. The method of claim 9, wherein the object comprises the person.

16. The method of claim 9, wherein the derived thermal profile is a three-dimensional thermal profile of the object.

* * * * *